(12) United States Patent
Shamoto et al.

(10) Patent No.: US 6,548,984 B2
(45) Date of Patent: Apr. 15, 2003

(54) POWER OUTPUT DEVICE

(75) Inventors: Sumikazu Shamoto, Nagoya (JP);
Shoichi Sasaki, Okazaki (JP); Eiji Sato, Toyota (JP); Masayuki Komatsu, Aichi-gun (JP); Kazunari Moriya, Aichi (JP); Hiroki Ohtani, Aichi (JP); Yukio Inaguma, Aichi (JP)

(73) Assignee: Toyoda Jidosha Kabushiki Kaisha, Toyota (JP)

( * ) Notice: Subject to any disclaimer, the term of this patent is extended or adjusted under 35 U.S.C. 154(b) by 25 days.

(21) Appl. No.: 09/887,016

(22) Filed: Jun. 25, 2001

(65) Prior Publication Data

US 2002/0000784 A1 Jan. 3, 2002

(30) Foreign Application Priority Data

Jun. 30, 2000 (JP) ........................... 2000-199767
Mar. 21, 2001 (JP) ........................... 2001-081158

(51) Int. Cl.⁷ .............................. H02P 5/34; H02P 7/42
(52) U.S. Cl. ..................................................... 318/801
(58) Field of Search ...................... 318/624, 767–768, 318/729, 771, 798, 801, 813

(56) References Cited

U.S. PATENT DOCUMENTS 5,963,442 A * 10/1999 Yoshida et al. ............ 318/801
6,242,883 B1 * 6/2001 Strunk ........................ 318/767
2002/0008496 A1   1/2002 Shamoto et al. ........... 320/116
2002/0070715 A1   6/2002 Sasaki et al. ............... 322/28

FOREIGN PATENT DOCUMENTS

| JP | A 5-207782 | 8/1993 |
| JP | A 10-337047 | 12/1998 |
| JP | A 10-337087 | 12/1998 |
| JP | A 11-55950 | 2/1999 |
| JP | A 11-55961 | 2/1999 |
| JP | A 11-178114 | 7/1999 |

* cited by examiner

Primary Examiner—Jeffrey Donels
(74) Attorney, Agent, or Firm—Oliff & Berridge, PLC

(57) ABSTRACT

When the absolute values of the negative voltage V− and the positive voltage V+ of a rectangular wave to be applied to the three phase coils of the motor driven using a rectangular-waved voltage are different, time T1 and time T2 for the rectangular wave are adjusted such that the area A representing the absolute value of a time integration value of the negative voltage V− and the area B representing the absolute value of a time integration value of the positive voltage V+ becomes equal to each other. With this adjustment, the average voltage of the rectangular wave becomes of value 0, so that a DC component current is prevented from flowing into the three phase coils of the motor.

20 Claims, 17 Drawing Sheets

POWER OUTPUT DEVICE

BACKGROUND OF THE INVENTION

1. Field of the Invention

The present invention relates to a power output device.

2. Description of the Related Art

As a conventional power output device, Japanese Patent Application Laid-open Nos. Hei 10-337047 and 11-178114, for example, disclose a device comprising a capacitor connected to the positive and negative bus bars of an inverter circuit which supplies three phase AC power to a motor, and a DC power source connected to the positive or negative bus bar of the inverter circuit and to the neutral point of the motor. This device uses a circuit comprising the motor coils of the respective phases and the inverter switching elements of the respective phases as a voltage booster chopper circuit to boost the voltage of the DC power source to charge the capacitor using the boosted voltage, and drives the motor using the capacitor thus charged as a DC power source. Motor driving and capacitor charging are simultaneously controlled through switching of the inverter switching elements when three phase AC power is supplied to the motor.

This type of power output device may cause ripples in motor torque or a large copper loss. That is, in the device, potential at the motor neutral point is fixed relative to that of the positive or negative bus bar because the DC power source is connected to either the positive or negative bus bar of the inverter circuit and to the motor neutral point. The voltage between the capacitor terminals (an inter-terminal voltage), namely, a potential difference between the positive and negative bus bars of the inverter circuit, can be set higher than that of the DC power source because the voltage of the DC power source is boosted. When rectangular wave control is executed by supplying a rectangular wave having a frequency equal to the motor electrical angle to drive the motor, a time period when each phase of a rectangular-waved three phase power generated by the inverter circuit has a negative voltage relative to the potential at the neutral point and a time period when each phase has a positive voltage relative to the potential are equal to each other when the inter-terminal voltage of the capacitor is exactly twice as large as the voltage of the DC power source. However, when the inter-terminal voltage is not exactly twice as large as the voltage of the DC power source, these time periods are different. In this case, a DC component current may flow into the motor windings, causing ripples in motor torque. The above described power output device, which uses a capacitor as at least one of its power sources, can control the inter-terminal voltage, and thus avoid the above described problem. However, a power output device which uses a general DC power source instead of a capacitor can neither control the voltage of the DC power source nor solve the above problem due to the product irregularity and altered voltage of the DC power source due to its successive use.

SUMMARY OF THE INVENTION

It is accordingly an object of the present invention to provide a power output device which can avoid ripples in motor torque even when the potential at the motor neutral point differs from the average of the potentials at the positive and negative bus bars of the inverter circuit. It is another object of the present invention to provide a power output device capable of supplying a current in a desired direction to the motor neutral point.

In order to achieve, at least partially, the objects of the present invention, according to a first aspect of the present invention, there is provided a power output device, comprising a motor designed to be driven to rotate using multiple phase AC power;

an inverter circuit supplying multiple phase AC power to the motor while switching a plurality of switching elements;

a first power source connected to a positive bus bar and a negative bus bar of the inverter circuit;

a second power source connected to the positive bus bar or the negative bus bar of the inverter circuit and to a neutral point of the motor; and a controller for controlling switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source.

In this power output device, the controller controls switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source. In this control, the predetermined ratio is a ratio that would make a difference between a time integration value of a voltage of a positive pulse and an absolute value of a time integration value of a voltage of a negative value become a predetermined value. When the predetermined value is zero, control is carried out such that no current flows into the neutral point of the motor so that ripples in motor torque can be suppressed. When the predetermined value is any value other than zero, control is carried out such that a current in a predetermined direction flows into the neutral point of the motor.

In this power output device according to the first aspect of the invention, the first power source may be chargeable using power supplied from the second power source.

According to the second aspect of the present invention, there is provided a power output device, comprising:

a motor designed to be driven to rotate using multiple phase AC power;

an inverter circuit supplying multiple phase AC power to the motor while switching a plurality of switching elements;

a first power source connected to a positive bus bar of the inverter circuit and to a neutral point of the motor;

a second power source connected to the negative bus bar of the inverter circuit and to a neutral point of the motor; and a controller for controlling switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source.

In this power output device according to a second aspect of the invention, the controller controls switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source. In this control, the predetermined ratio may be a ratio that would make a difference between a time integration value of a voltage of a positive pulse and an absolute value of a time integration value of a voltage of a negative value become a predetermined value. When the predetermined value is zero, control is carried out such that no current flows into the neutral point of the motor so that ripples in motor torque can be suppressed. When the predetermined value is any value other than zero, control is carried out such that a current in a predetermined direction flows into the neutral point of the motor.

In this power output device according to a second aspect of the present invention, the first power source may be chargeable using power supplied from the second power source, and the second power source may be chargeable using power supplied from the first power source.

A power output device according to the second aspect of the present invention may comprise a chargeable and dischargeable capacitor, connected to the positive bus bar and the negative bus bar of the inverter circuit.

In a power output device according to the first or second aspect of the present invention, which uses a ratio which would make a difference between a time integration value of a positive pulse and the absolute value of a time integration value of a negative pulse become a predetermined value, the controller adjusts a ratio between the positive pulse and the negative pulse, concerning the respective phases of the multiple phase AC power, such that the difference becomes the predetermined value.

Also, in a power output device according to the first or second aspect of the present invention, which uses a ratio which would make a difference between a time integration value of a positive pulse and the absolute value of a time integration value of a negative pulse become a predetermined value, the controller adjusts an effective voltage of either the positive pulse or the negative pulse, concerning the respective phases of the multiple phase AC power, such that the difference becomes a predetermined value. In this power output device, the effective voltage of the pulse is adjusted through pulse width modulation.

In a power output device according to the first or second aspect of the present invention, the motor may be a power generation motor capable of power generation in response to power input thereto. The first power source and/or the second power source may be a rechargeable and dischargeable power source. The power output device may comprise charge control for driving the motor so as to operate as a power generator, and controlling switching of the plurality of switching elements of the inverter circuit so as to charge the first power source and/or the second power source using power generated by the motor.

DESCRIPTION OF THE PREFERRED EMBODIMENTS

The present invention will next be described with reference to the embodiments of the invention.

Figure 1:
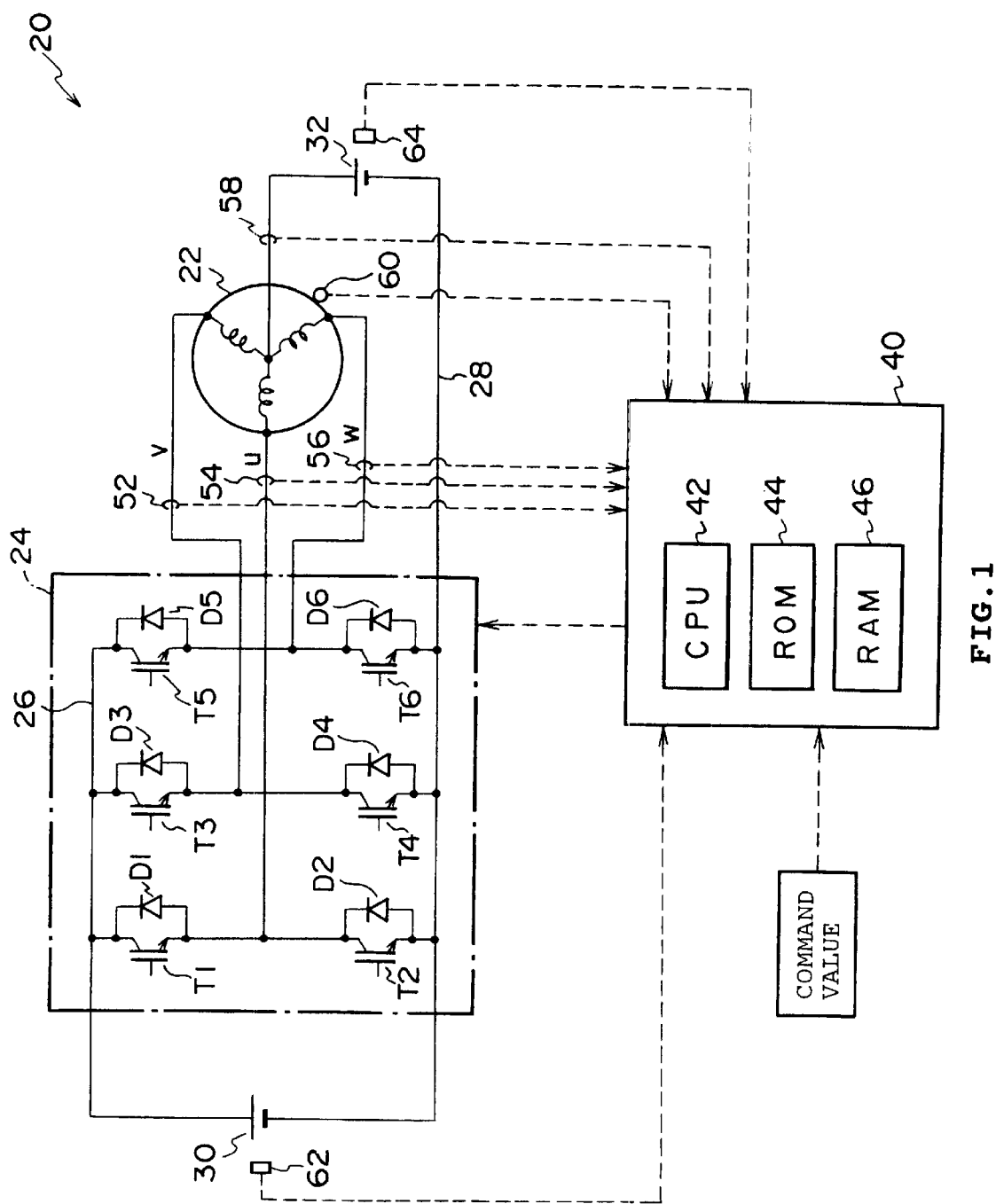
FIG. 1 is a schematic diagram showing a structure of a power output device 20 in one preferred embodiment of the present invention.

FIG. 1 is a schematic diagram showing a structure of a power output device 20 in a first embodiment of the present invention. The power output device 20 comprises a motor 22 designed to be driven to rotate using a three phase AC power, an inverter circuit 24 designed to convert direct power to three phase AC power for supply to the motor 22, a first DC power source 30 connected to the positive bus bar 26 and the negative bus bar 28 of the inverter circuit 24, a second DC power source 32 connected to the negative bus bar 28 of the inverter circuit 24 and the neutral point of the motor 22, and an electronic control unit 40 designed to control the whole device.

The motor 22 is configured to serve as a synchronous generator motor capable of power generation, comprising a rotor having a permanent magnet attached on its outer surface and a stator wound by three phase coils. The rotation axis of the motor 22 also serves as an output axis of the power output device 20, via which power is output. The motor 22, which is configured to serve as a generator motor, can generate power when it receives a driving force via its rotation axis.

The inverter circuit 24 comprises six transistors T1 to T6 and six diodes D1 to D6. The six transistors T1 to T6 are connected in pairs. Specifically, one of the paired transistors T1 to T6 is connected to the positive bus bar 26 on its source side, while the other is connected to the negative bus bar 28 on its sink side. Respective paired transistors T1 to T6 are connected to each other, and the respective three phase coils (u, v, s) of the motor 22 are connected to the respective connection points between the respective paired transistors T1 to T6. With this arrangement, when a ratio in time when the paired transistors T1 to T6 respectively remain in an ON state is adjusted while voltage is supplied to the positive bus bar 26 and the negative bus bar 28, a rotational magnetic field is formed due to a current flowing through the three phase coils of the motor 22, whereby the motor 22 is driven to rotate.

The first DC power source 30 and the second DC power source 32 are realized in the form of a nickel hydrogen based or lithium ion based secondary battery, for example, and controlled such that the inter-terminal voltage V1 of the first DC power source 30 becomes twice as large as the inter-terminal voltage V2 of the second DC power source 32.

The electronic control unit 40 is realized in the form of a microprocessor having a CPU 42 as its major component. The electronic control unit 40 comprises a ROM 44 designed to store a process program, and a RAM 46 designed to temporarily store data, and input and output ports, not shown. The electronic control unit 40 receives, via its input port, the value of current of the respective phases, supplied from the respective current sensors 52 to 56, provided for the respective phases (u, v, w) of the three phase coil of the motor 22, the value of a neutral point current, supplied from the current sensor 58, provided to the neutral point of the motor 22, the value of a rotational angle of the rotor of the motor 22, supplied from the rotational angle sensor 60, provided to the rotational axis of the motor 22, the value of the inter-terminal voltage V1 of the first DC power source 30, supplied from the voltage sensor 62, provided to the first DC power source 30, the value of the inter-terminal voltage V2 of the second DC power source 32, supplied from the voltage sensor 64, provided to the second DC power source 32, a command value concerning operation of the motor 22, and the like. The electronic control unit 40 outputs, via its output port, a control signal or the like for use in switching control of the transistors T1 to T6 of the inverter circuit 24.

Operation of the thus structured power output device 20, in particular, rectangular wave control operation executed when driving the motor 22 using a rectangular-waved voltage will next be described.

Figure 2:
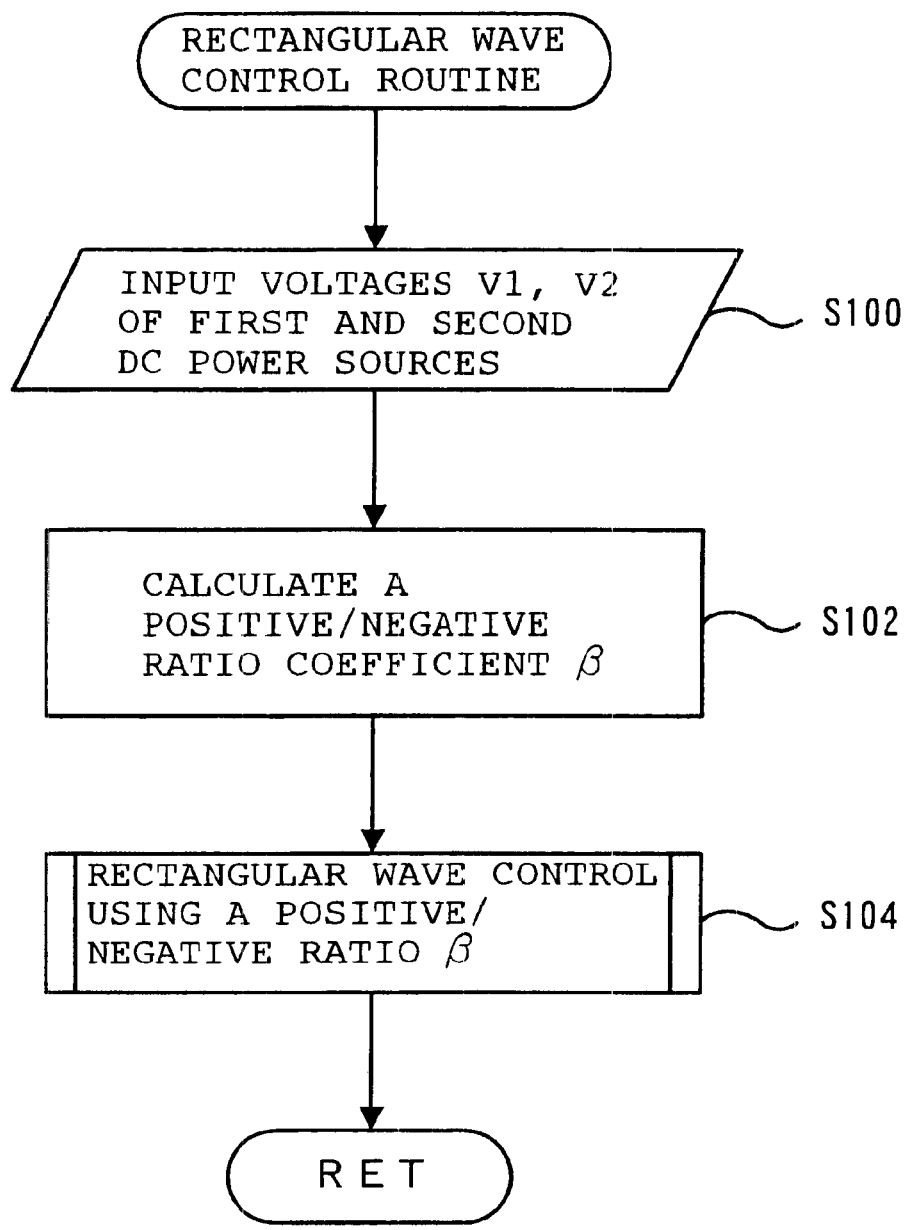
FIG. 2 is a flowchart showing an example of a rectangular wave control routine executed by the electric control unit 40 of the power output device 20.

FIG. 2 is a flowchart showing an example of a routine of rectangular wave control executed by the electronic control unit 40 of the power output device 20 when the inverter circuit 24 drives the motor 22 using a rectangular wave. This routine is repeated for every predetermined amount of time.

To start the rectangular wave control routine, the CPU 42 of the electronic control unit 40 first reads the voltage V1 of the first DC power source 30 and the voltage V2 of the second DC power source 32, detected by the voltage sensors 62, 64, respectively (step S100). The CPU 42 then calculates a positive/negative ratio coefficient β based on the read voltages V1, V2 using the following expression (1) (step S102).

Note that a positive/negative ratio coefficient β is a ratio (expression 2) between time t1 when the rectangular wave to be supplied to the three phase coils of the motor 22 has a negative voltage (negative voltage time t1) and time t2 when the rectangular wave has a positive voltage (positive voltage time t2).

$$\beta = V2/(V1-V2) \tag{1}$$

$$\beta = t2/T1 \tag{2}$$

The CPU 42 finally performs rectangular wave control such that the ratio between the negative voltage time T1 and the positive voltage time T2 of a rectangular wave to be supplied to the three phase coil of the motor 22, becomes equal to the positive/negative ratio coefficient β (step S104). This marks the end of the rectangular wave control routine.

Rectangular wave control is identical to general control except that the negative voltage time T1 and the positive voltage time T2 of the rectangular wave are different. In rectangular wave control, the frequency of the rectangular wave, for example, may be determined based on the rotational speed of the rotor calculated based on the rotational angle of the rotor informed by the rotational angle sensor 60.

Figure 3:
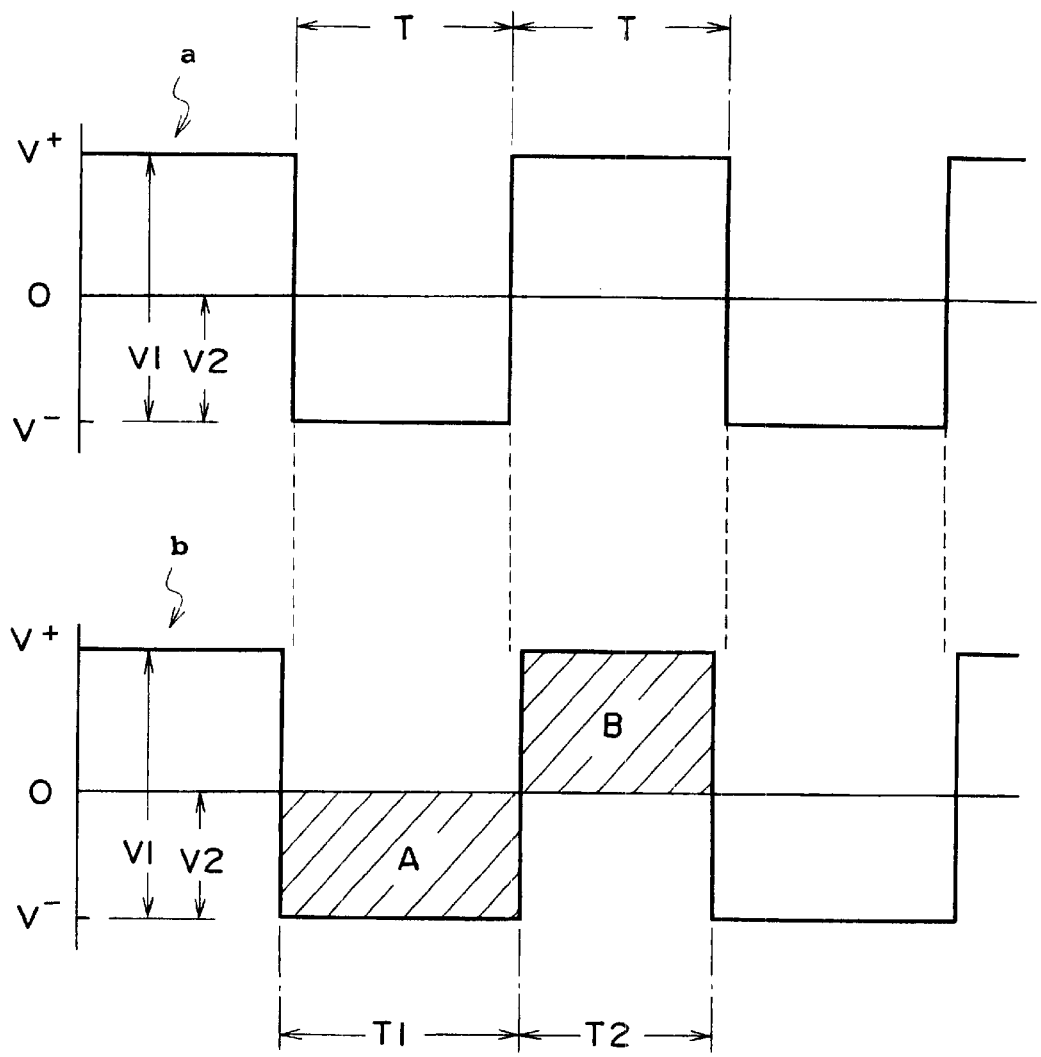
FIG. 3 is a diagram explaining control of a rectangular wave using a positive/negative ratio coefficient β.

FIG. 3 is a diagram explaining control of a rectangular wave using a positive/negative ratio coefficient β. In FIG. 3, the waveform (a) represents a u-phase rectangular wave controlled without using a positive/negative ratio coefficient β, and the waveform (b) represents a u-phase rectangular wave controlled using a positive/negative ratio coefficient β.

Assuming that the potential at the neutral point of the motor 22 is 0 V, the negative voltage V− of the rectangular wave is a negative voltage having the same magnitude as the voltage V2 of the second DC power source 32 as the second DC power source 32 is connected to the neutral point of the motor 22, and the positive voltage V+ of the wave becomes equal to the voltage V1 of the first DC power source 30 deducted by the voltage V2.

When the rectangular wave is controlled without using a positive/negative ratio coefficient β, the negative voltage V− time and the positive voltage V+ time of the rectangular wave become equal, or time T. In this case, no problem may be caused as long as the absolute values of the negative and positive voltages V−, V+ are equal. However, should the absolute values of the negative voltage V− and the negative voltage V+ be different, the average of the rectangular wave does not become a value of 0, and a DC component current may thus flow into the three phase coils of the motor 22.

Meanwhile, when the rectangular wave is controlled using a positive/negative ratio coefficient β, the ratio between time T1 for the negative voltage V− and time T2 for the positive voltage V+, or T2/T1, is adjusted to be equal to the positive/negative ratio coefficient β. Here, elimination of β from the above expressions (1), (2) results in V2·T1=(V1−V2)·T2. This means that the area A, indicated by the diagonal lines over the waveform (b) in FIG. 3, corresponding to the absolute value of a time integration value of the negative voltage V−, becomes equal to the area B, indicated by that, corresponding to a time integration value of the positive voltage V+. That is, the average of the rectangular wave becomes a value of 0, and thus no DC component current flows into the three phase coils of the motor 22. Note that, similar to the u-phase rectangular wave shown in FIG. 3, a v-phase or w-phase rectangular wave may also be similarly adjusted.

As described above, according to the rectangular wave control routine shown in FIG. 2, it is possible to control such that no DC component current flows into the three phase coils of the motor 22. This control is carried out using a positive/negative ratio coefficient β, or a ratio between a negative voltage V− time T1 and a positive voltage V+ time T2 of a rectangular wave, which is calculated based on the voltage V1 of the first DC power source 30 and the voltage V2 of the second DC power source 32. Besides this control, it is also possible to control such that desired DC component current does flow into the three phase coils of the motor 22. This is realized according to the rectangular wave control routine shown in FIG. 4, instead of that in FIG. 2.

Figure 4:
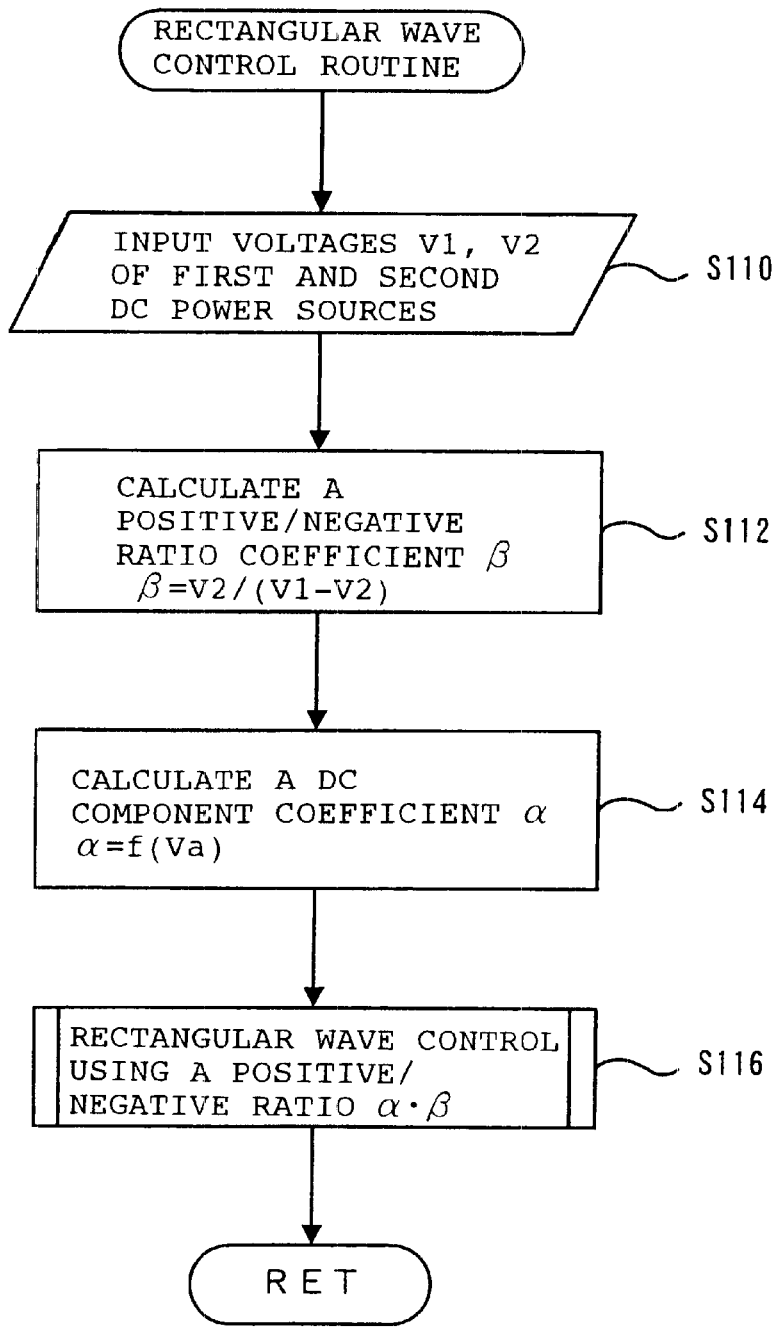
FIG. 4 is a flowchart showing an example of a rectangular wave control routine executed by the electric control unit 40 in controlling such that a DC component current flows into three phase coils of the motor 22.

To start the rectangular wave control routine shown in FIG. 4, the CPU 42 of the electronic control unit 40 first conducts the processes identical to those at steps S100 and S102 of the rectangular wave control routine shown in FIG. 2. Namely, the CPU 42 reads values of the respective voltages V1, V2 of the first and second DC power sources 30, 32, respectively, and calculates a positive/negative ratio coefficient β (steps S110, S112). The CPU 42 then calculates a DC component coefficient α based on the average voltage Va of the rectangular wave, which could generate a desired DC component current in the three phase coils of the motor 22 (step S114).

Here, the average voltage Va of a rectangular wave can be obtained based on the direction and magnitude of a DC component current because the average voltage Va of a rectangular wave retains some correlation to a DC component current, the correlation depending on the structure of the motor, the voltages V1, V2 of the first and second DC power sources, 30, 32, respectively, and so on. A DC component coefficient α is a ratio between a negative voltage V− time T3 and a positive voltage V+ time, i.e., α=T4/T3, which is obtained when the negative and positive voltages V−, V+ of a rectangular wave to be supplied to the three phase coils of the motor 22 have equal absolute values.

Figure 5:
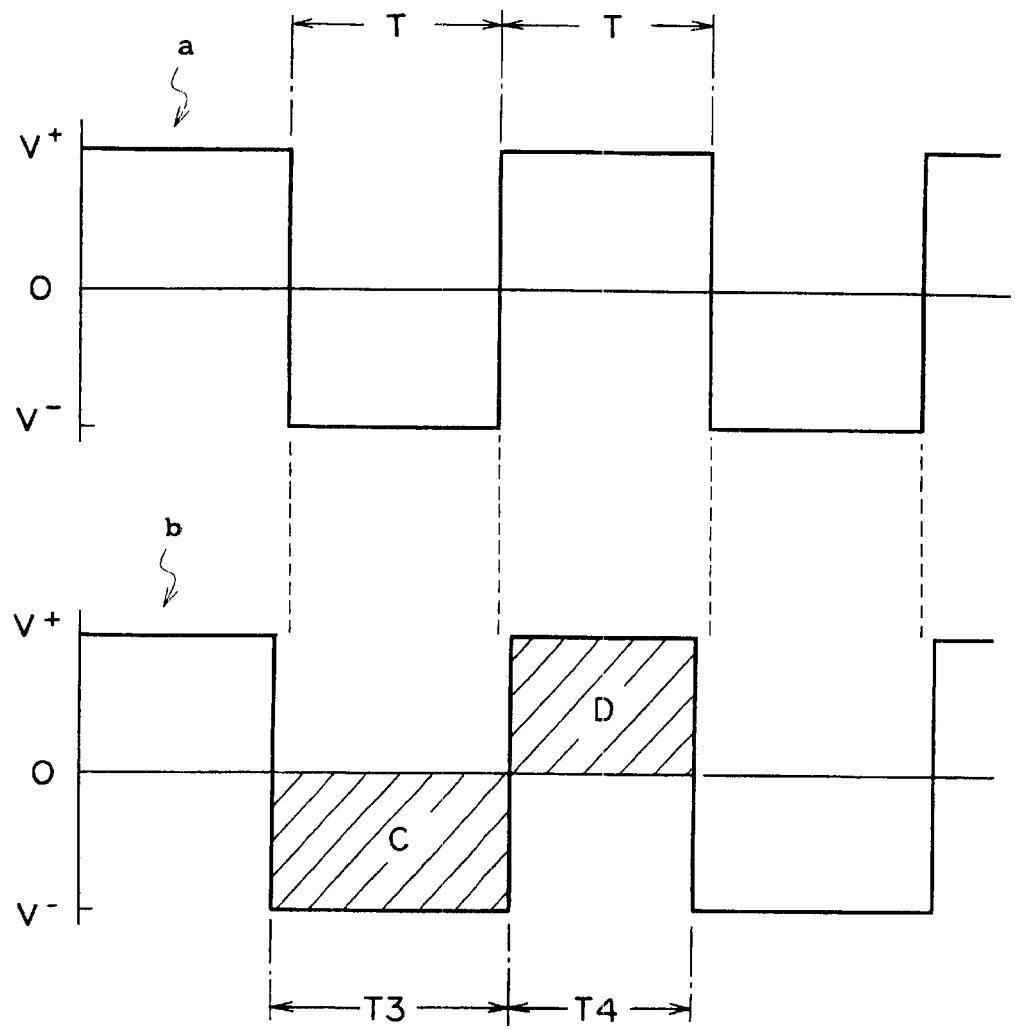
FIG. 5 is a diagram explaining control of a rectangular wave using a DC component coefficient α.

FIG. 5 is a diagram explaining control of a rectangular wave using a DC component coefficient α. In FIG. 5, the waveform (a) represents a normal u-phase rectangular wave having negative and positive voltages V−, V+ of equal absolute values, and the waveform (b) represents a u-phase rectangular wave having negative and positive voltages V−, V+ of equal absolute values, controlled using a DC component coefficient α.

When the rectangular wave is controlled such that time T3 for the negative voltage V− becomes different from time T4 for the positive voltage V+, as shown as the waveform (b), the area C, indicated by the diagonal lines over the waveform (b), corresponding to the absolute value of a time integration value of the negative voltage V−, becomes different from the area D, indicated by that, corresponding to a time integration value of the positive voltage V+, thus resulting in an average voltage Va, calculated as Va=(D−C)/(T3+T4). As a result, a DC component current commensurate with the average voltage Va flows into the three phase coils of the motor 22 as the average voltage Va has some correlation to a DC component current in the three phase coils of the motor 22, as described above. Note that, similar to the u-phase rectangular wave shown in FIG. 5, a v-phase or w-phase rectangular wave may also be adjusted.

After calculation of a DC component coefficient α, the CPU 42 finally performs rectangular wave control such that the ratio (T5/T6) between time T5 for the negative voltage V− and time T6 for the positive voltage V+ of a rectangular wave to be supplied to the three phase coils of the motor 22 becomes equal to the product of the DC component coefficient α and the positive/negative ratio coefficient β (step S116). This marks the end of the rectangular wave control routine.

The rectangular wave control is applied as described above, specifically, such that the ratio between time T5 and time T6, or T5/T6, becomes equal to the product of the DC component coefficient α and the positive/negative ratio coefficient β. This relies on the fact that, when the absolute values of the negative and positive voltages V−, V+ are different, in order to block a DC component current from flowing into the three phase coils of the motor 22, a ratio in time between the positive and negative voltages of the rectangular wave should be determined based on the positive/negative ratio coefficient β. Moreover, in order to cause a current of desired DC component to begin flowing into the three phase coils, the ratio should be determined based on the DC component coefficient α. That is, the waveform (b) should be modified in consideration of a DC component coefficient α.

As described above, advantageously, the power output device 20 can block a DC component current from flowing into the three phase coils of the motor 22 even when the voltage V1 of the first DC power source 30 is not exactly twice as large as the voltage V2 of the second DC power source 32. This enables suppression of ripples in torque from the motor 22, which are generally caused due to a DC component current flowing into the three phase coils of the motor 22. Moreover, the device 20 also can cause a current of desired DC component to flow into the three phase coils of the motor 22. Conclusively, it is possible to control a DC component current flowing into the three phase coils of the motor 22.

In the above example, the second DC power source 32 is connected to the negative bus bar 28 of the inverter circuit 24 and the neutral point of the motor 22 in the power output device 20. Alternatively, the second DC power source 32 may be connected to the positive bus bar 26 of the inverter circuit 24 and the neutral point of the motor 22. In the latter arrangement, a positive/negative ratio coefficient β may be calculated as β=(V1−V2)/V2 because the positive voltage V+ corresponds to the voltage V2 of the second DC power source 32.

Also, while the power output device 20 comprises a first DC power source 30 connected to the positive bus bar 26 and the negative bus bar 28 of the inverter circuit 24 in the above example, the power output device 20 may additionally comprise a smoothing capacitor connecting the positive bus bar 26 and the negative bus bar 28 in parallel to the first DC power source 30.

Figure 6:
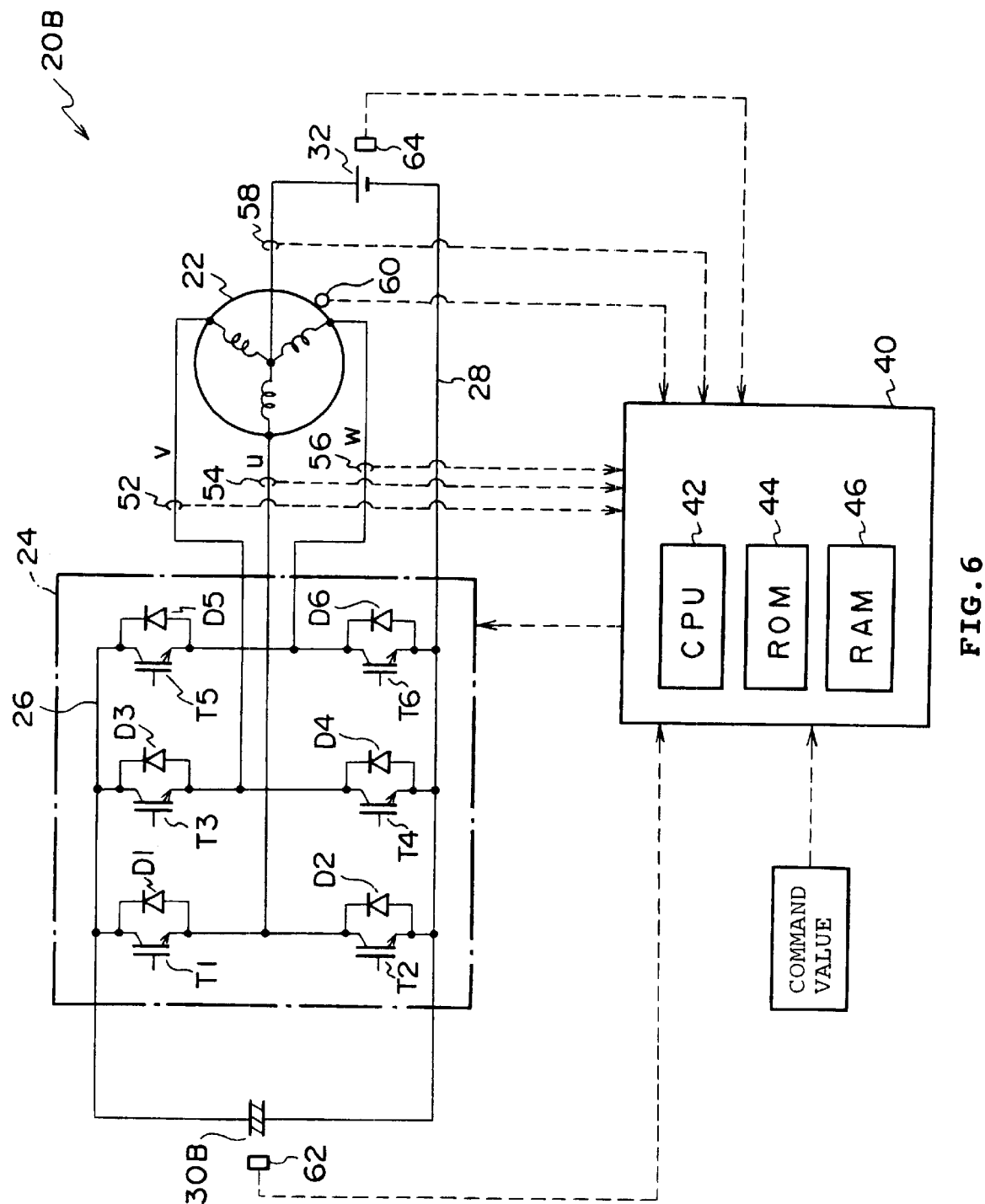
FIG. 6 is a diagram schematically showing a structure of a modified power output device 20B.

Further, in the place of a first DC power source 30 connecting the positive bus bar 26 and the negative bus bar 28 of the inverter circuit 24 in the power output device 20, a capacitor 30B may be provided, as shown in a modified power output device 20B in FIG. 6.

Figure 7:
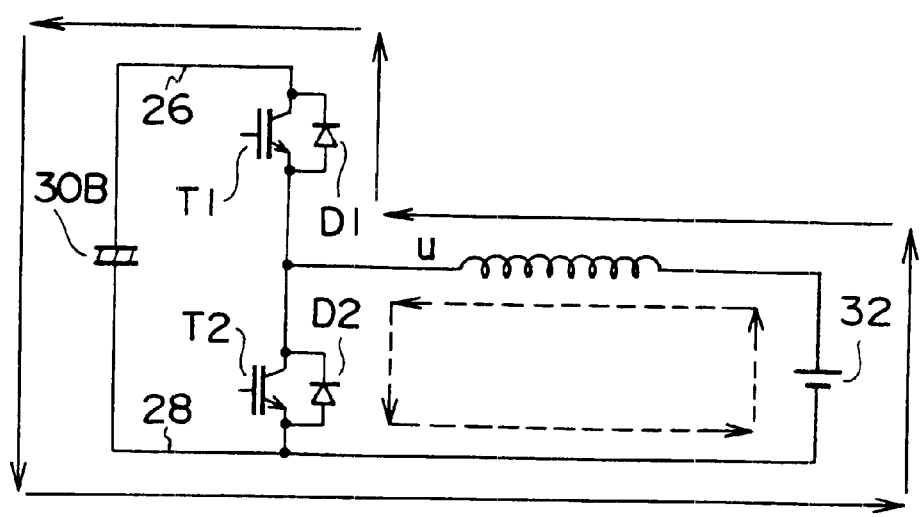
FIG. 7 is diagram showing a circuit of the modified power output device 20B featuring a u-phase coil of the motor 22.

FIG. 7 is a diagram showing a circuit of a modified power output device 20B featuring a u-phase coil of the motor 22. When the u-phase transistor T2 of the inverter circuit 24 remains in an ON state, a short circuit, indicated by the broken line arrows in the drawing, remains formed, and as a result the u-phase coil of the motor 22 serves as a reactor. By then turning off the transistor T2, the energy stored in the u-phase coil, which is then serving as a reactor, is transmitted to and stored in the capacitor 30B through the charge circuit, indicated by the solid line arrows in the drawing. In this charging, the voltage at the capacitor 30B can be set higher than that which is supplied from the second DC power source 32. In addition, the second DC power source 32 can be charged using the potential at the capacitor 30B in this circuit. Conclusively, the circuit shown in FIG. 7 can be considered a voltage booster chopper circuit which can boost the energy from the second DC power source 32 to store in the capacitor 30B, and also charge the second DC power source 32 using the potential at the capacitor 30B.

The v phase and w phase coils of the motor 22 can also be considered a booster and depressor chopper circuit. Charging of the capacitor 30B and that of the second DC power source 32 using the potential at the capacitor 30B can both be achieved by turning on or off the transistors T2, T4, T6.

This charging causes a potential difference between the terminals of the capacitor 30B. This difference can be controlled through control of the amount of charge stored in the capacitor 30B, namely, the amount of current to be supplied to the reactor. Therefore, it is possible to set the inter-terminal voltage Vc of the capacitor 30B twice as large as the voltage V2 of the second DC power source 32. Once a voltage twice as large as the voltage V2 of the second DC power source 32 is set for the inter-terminal voltage at the capacitor 30B, the power output device 20B shown in FIG. 6 is resultantly brought into a state where the inter-terminal voltage Vc at the capacitor 30B is applied to the positive bus bar 26 and the negative bus bar 28. This corresponds to a state in which a DC power source corresponding to the first DC power source 30 of the power output device 20 is connected. Therefore, the device 20B can drive the motor 20 using rectangular wave control, similar to the power output device 20.

As described above, using a rectangular wave control, in which the average voltage Va of a rectangular wave is freely adjustable, it is possible to control the inter-terminal voltage Vc of the capacitor 30B, while controlling the driving of the motor 22, through adjustment of the DC component current flowing into the three phase coils of the motor 22 through control of the average voltage Va of a rectangular wave.

As a result, the modified power output device 20B is adapted to the rectangular wave control routines shown in FIG. 2 and FIG. 4, similar to the power output device 20 in the first embodiment.

Next, a power output device 120 in a second preferred embodiment of the present invention will be described.

Figure 8:
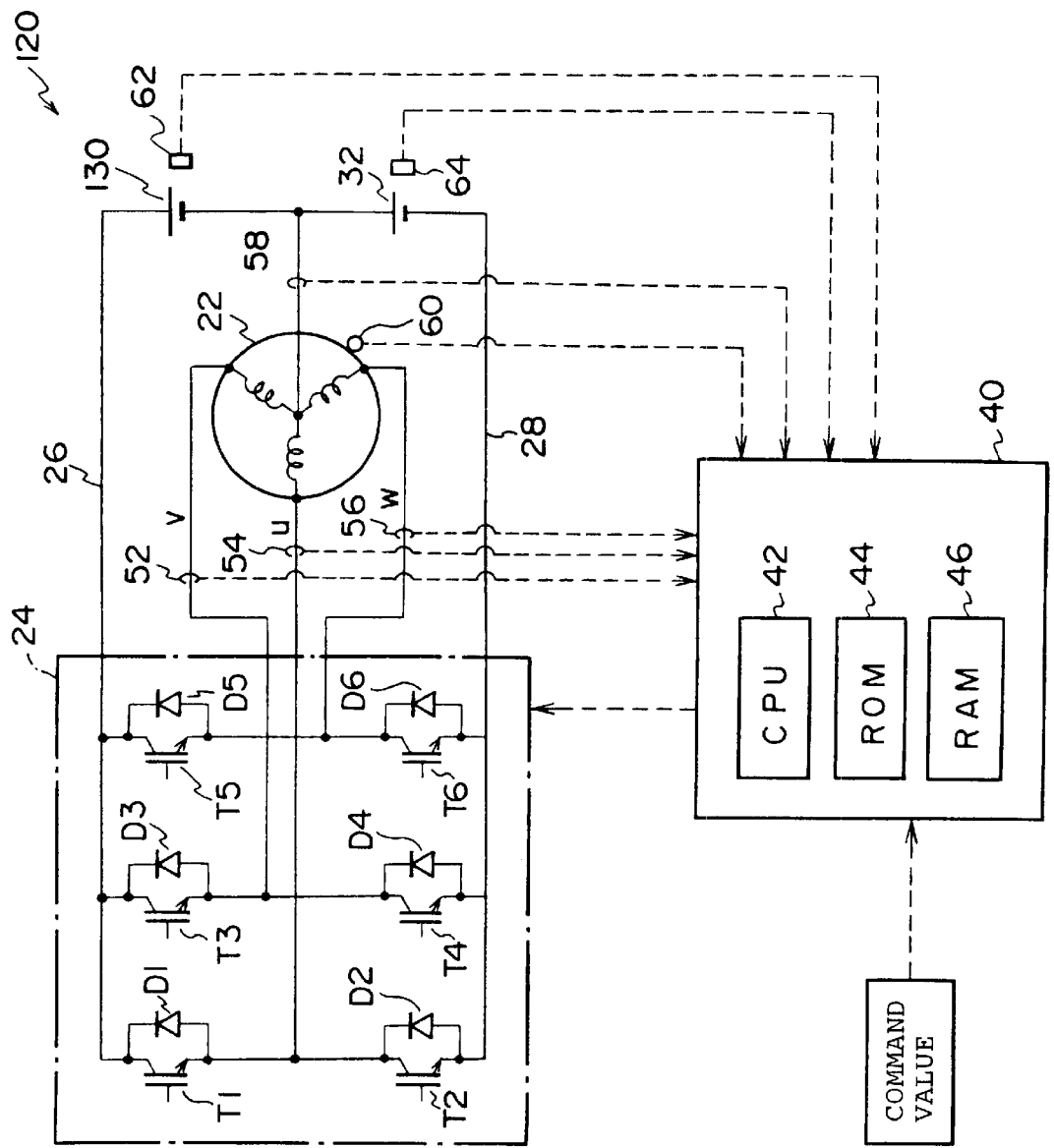
FIG. 8 is a diagram schematically showing a structure of a power output device 120 in a second preferred embodiment of the present invention.

FIG. 8 is a diagram schematically showing a structure of a power output device 120. The structure of the power output device 120 is identical to that of the power output device 20 in the first preferred embodiment except that the positive bus bar 26 and the negative bus bar 28 of the inverter circuit 24 are not connected to each other via the first DC power source 30, and that the positive bus bar 26 of the inverter circuit 24 is connected to the neutral point of the motor 22 via the first DC power source 130. Elements in the power output device 120 which are identical to those in the power output device 20 are given identical reference numerals, and descriptions of them are not repeated.

The power output device 120 comprises a first DC power source 130 connected to the positive bus bar 26 of the inverter circuit 24 and to the neutral point of the motor 22, and a second DC power source 32 connected to the negative bus bar 28 of the inverter circuit 24 and to the neutral point of the motor 22. The first DC power source 130 and the second DC power source 32, which serially connect the positive bus bar 26 and the negative bus bar 28 of the inverter circuit 24, can be considered to constitute a structure in which a DC power source having a voltage equal to the sum of the voltage V1 of the first DC power source 130 and the voltage V2 of the second DC power source 32 is provided so as to connect the positive bus bar 26 and the negative bus bar 28 of the inverter circuit 24, and the second DC power source 32 is provided so as to connect the negative bus bar 28 of the inverter circuit 24 and the neutral point of the motor 22. This is identical to that of the power output device 20 in the first embodiment.

As will be appreciated from the above, the power output device 120 in the second embodiment, having a structure equivalent to that of the power output device 20 in the first embodiment, is adapted to rectangular wave control shown in FIGS. 2 and 4, similar to the power output device 20. With this device 120, a positive/negative ratio coefficient $\beta$ is calculated as $\beta = V2/V1$.

Moreover, having a structure equivalent to that of the power output device 20 in the first embodiment, the power output device 120 also can produce the advantages achieved by the power output device 20. Specifically, the device 120 can block a DC component current from flowing into the three phase coils of the motor 22 so that ripples in torque of the motor 22 can be suppressed even when the voltage V1 of the first DC power source 130 is not exactly twice as large as the voltage V2 of the second DC power source 32. Moreover, the device 120 can cause a current of desired DC component to flow into the three phase coils of the motor 22.

In the power output device 120, the DC power source 130 and the second DC power source 32 are serially connected to the positive bus bar 26 and the negative bus bar 28 of the inverter circuit 24. Alternatively, a smoothing capacitor may additionally be connected to the positive bus bar 26 and the negative bus bar 28 of the inverter circuit 24.

Figure 9:
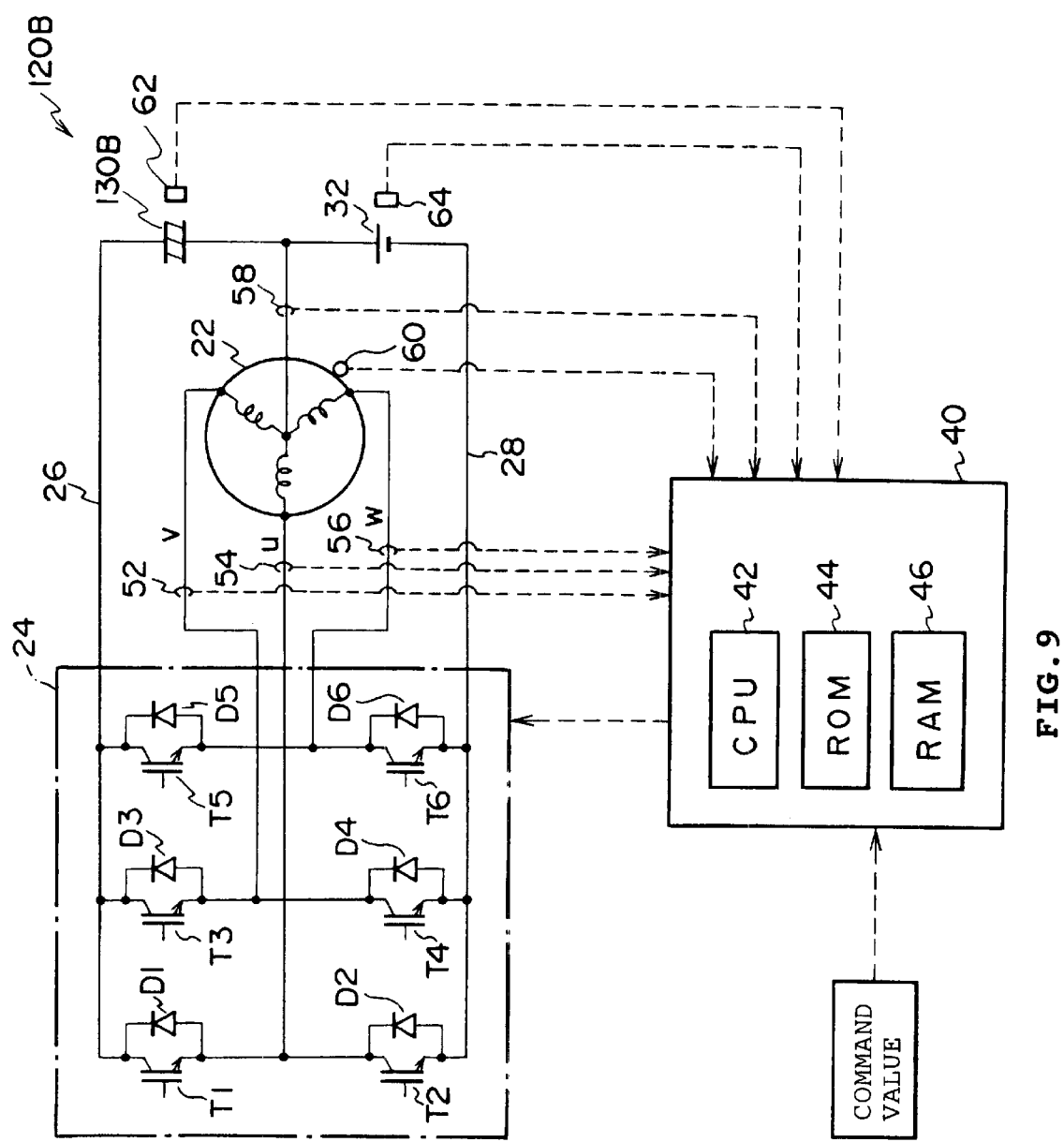
FIG. 9 is a diagram schematically showing a structure of a modified power output device 120B.

Also, in the place of the first DC power source 130 provided so as to connect the positive bus bar 26 of the inverter circuit 24 and the neutral point of the motor 22 in the power output device 120, a capacitor 130B may be provided so as to connect the positive bus bar 26 of the inverter circuit 24 and the neutral point of the motor 22, as shown in a modified power output device 120B in FIG. 9.

Figure 10:
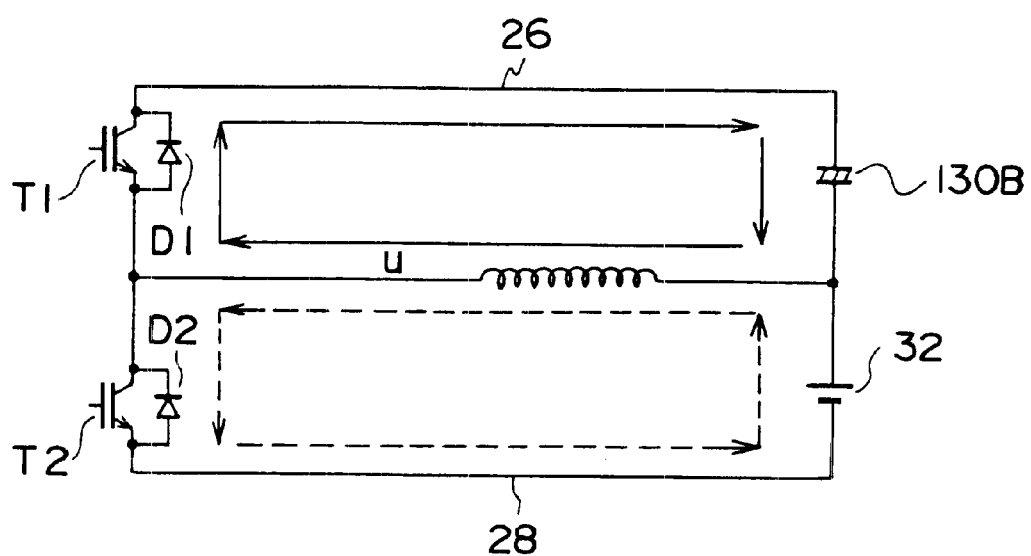
FIG. 10 is diagram showing a circuit of the modified power output device 120B featuring a u-phase coil of the motor 22.

FIG. 10 is a diagram showing a circuit of a modified power output device 120B featuring a u-phase coil of the motor 22. When the u-phase transistor T2 of the inverter circuit 24 remains in an ON state, a short circuit, indicated by the broken line arrows in the drawing, remains formed, and the u-phase coil of the motor 22 resultantly serves as a reactor. By then turning off the transistor T2, the energy stored in the u-phase coil, which is then serving as a reactor, is transmitted to and stored in the capacitor 130B through the charge circuit, indicated by the solid line arrows in the drawing. Meanwhile, by turning off the transistor T1, the second DC power source 32 can be charged using the potential at the capacitor 130B in this circuit. As a result, the circuit shown in FIG. 10 can be considered a chopper circuit which can store the energy from the second DC power source 32 in the capacitor 130B, and charge the second DC power source 32 using the potential at the capacitor 130B. The v phase and w phase coils of the motor 22 can also be similarly considered a chopper circuit. Charging the capacitor 130B and charging the second DC power source 32 using the potential of the capacitor 130B can both be achieved by turning the transistors T1 to T6 on or off.

This charging causes a potential difference between the terminals of the capacitor 130B. The difference can be controlled through control of the amount of charge stored in the capacitor 130B, namely, the amount of current to be supplied to the reactor. Therefore, it is possible to set the inter-terminal voltage Vc of the capacitor 30B equal to the voltage V2 of the second DC power source 32. Once a voltage equal to the voltage V2 of the second DC power source 32 is set for the inter-terminal voltage Vc at the capacitor 130B, the power output device 120B of the modified example shown in FIG. 9 is resultantly brought into a state in which the inter-terminal voltage Vc at the capacitor 130B is applied to the positive bus bar 26 and the neutral point of the motor 22. This corresponds to a state in which a DC power source corresponding to the first DC power source 130 of the power output device 120 is connected.

Therefore, the power output device 120B can drive the motor 22 using rectangular wave control, similar to the power output device 120 in the second embodiment.

As described above, using a rectangular wave control, in which the average voltage Va of a rectangular wave is freely adjustable, it is possible to control the inter-terminal voltage Vc of the capacitor 30B, while controlling the driving of the motor 22, through control of a DC component current flowing into the three phase coils of the motor 22 through adjustment of the average voltage Va of a rectangular wave.

As a result, the modified power output device 120B is adapted to the rectangular wave control routines shown in FIGS. 2 and FIG. 4, similar to the power output device 120 in the second embodiment.

In the modified power output device 120B, the capacitor 130B is provided so as to connect the positive bus bar 26 of the inverter circuit 24 and the neutral point of the motor 22, while the second DC power source 32 is provided so as to connect the negative bus bar 28 of the inverter circuit 24 and the neutral point of the motor 22 in the modified power output device 120B. Alternatively, the second DC power source 32 may be provided so as to connect the positive bus bar 26 of the inverter circuit 24 and the neutral point to the motor 22, while the capacitor 130B may be provided so as to connect the negative bus bar 28 of the inverter circuit 24 and the neutral point of the motor 22.

Here, in the power output devices 20, 120 in the first and second embodiments, respectively, the ratio between time T1, T3 for the negative voltage V− and time T2, T4 for the positive voltage V+ of a rectangular wave is controlled or adjusted for controlling such that a DC component current does not flow into the three phase coils of the motor 22 or a current of desired DC component flows into the three phase coils of the motor 22. For this purpose, alternatively, the effective voltage of the negative or positive voltage V−, V+ of a rectangular wave may be adjusted.

Specifically, the effective voltage of a pulse of a rectangular wave on the negative voltage V− side (a negative pulse) or on the positive voltage V+ side (a positive pulse) is adjusted. With this adjustment, which is achieved through switching of the transistors T1 to T6 of the inverter circuit 24, a difference between an area representing the absolute value of a time integration value of the effective voltage of the negative pulse and an area representing a time integration value of the effective voltage of the positive pulse is adjusted for controlling the current of CD component.

In the following, the above control of a DC component current so as not to flow into the three phase coils of the motor 22 will be described.

Figure 11:
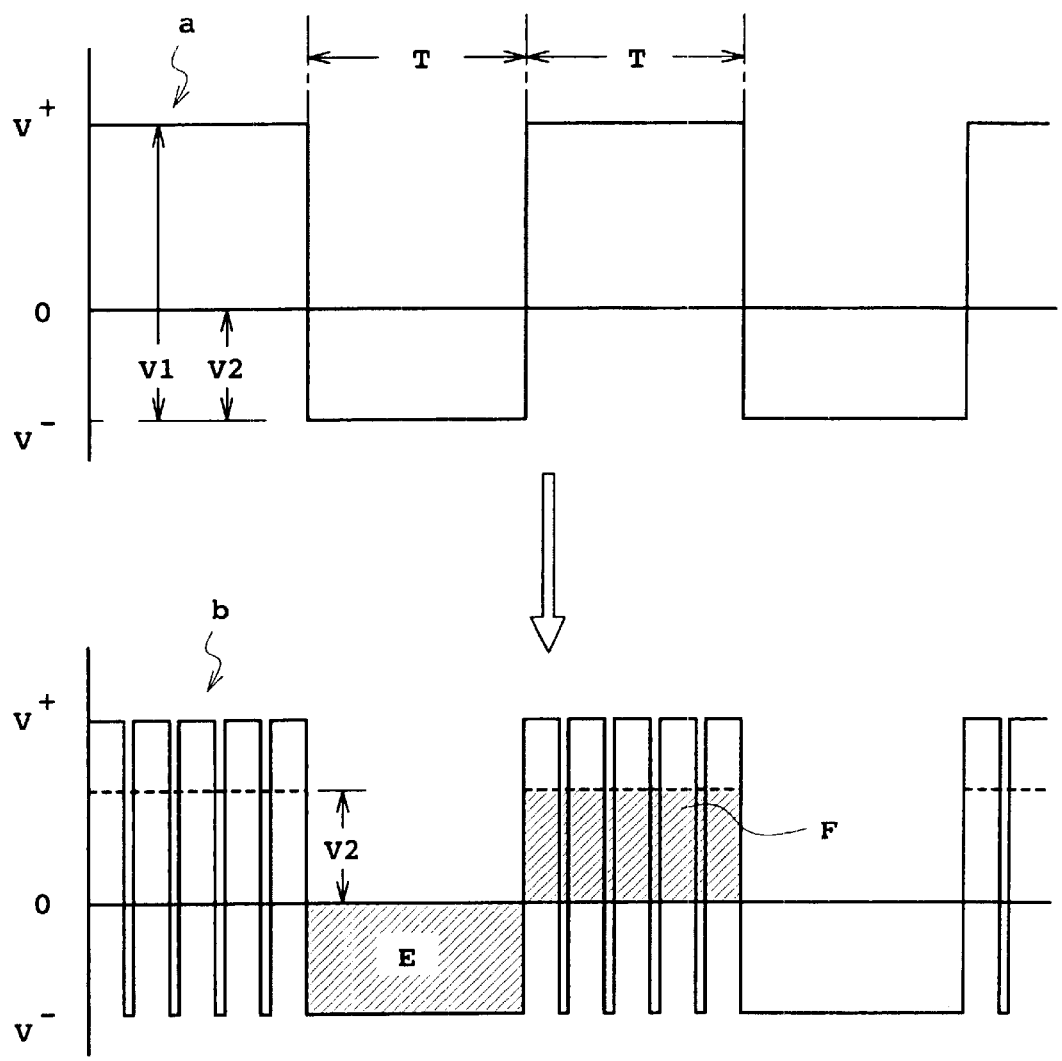
FIG. 11 is a diagram explaining adjustment of the effective voltage of a rectangular wave.

FIG. 11 is a diagram explaining adjustment of the effective voltage of a rectangular wave. In FIG. 11, the waveform (a) represents a u-phase rectangular wave for which effective voltage is not adjusted, and the waveform (b) represents a u-phase rectangular wave for which effective voltage is adjusted. In regular rectangular wave control, in which the negative voltage V− time and the positive voltage V+ time are equal, or time T, the average voltage of the rectangular wave does not become of value 0 and a DC component current thus flows into the three phase coils of the motor 22 when the absolute values of the negative voltage V− and the positive voltage V+ are different. In order to address this problem, either the negative or positive pulse is adjusted into having a comb-like shape with equidistant teeth, or a pulse having a rectangular-waved effective area shown as defined by the broken line over the waveform (b) in FIG. 11. This adjustment is made through switching of the transistors T1 to T6 of the inverter circuit 24.

Specifically, when adjustment is made such that the effective areas of the negative and positive pulses to be supplied to the motor 22 become equal to each other, the area E, indicated by the diagonal lines over the waveform (b) corresponding to the absolute value of a time integration value of the negative pulse voltage, becomes equal to the area F, indicated by that, corresponding to a time integration value of the positive pulse voltage, so that no DC component current flows into the three phase coils of the motor 22. Note that, similar to the u-phase rectangular wave shown in FIG. 11, v-phase or w-phase rectangular wave can also be adjusted. This prevention of a DC component current from flowing into the three phase coils of the motor 22 as described above can be realized according to the rectangular wave control routine shown in FIG. 12, instead of that of FIG. 2.

In the following, the routine described in FIG. 12 will be described with reference to FIG. 13, which explains adjustment of the effective voltage of a rectangular wave.

Figure 12:
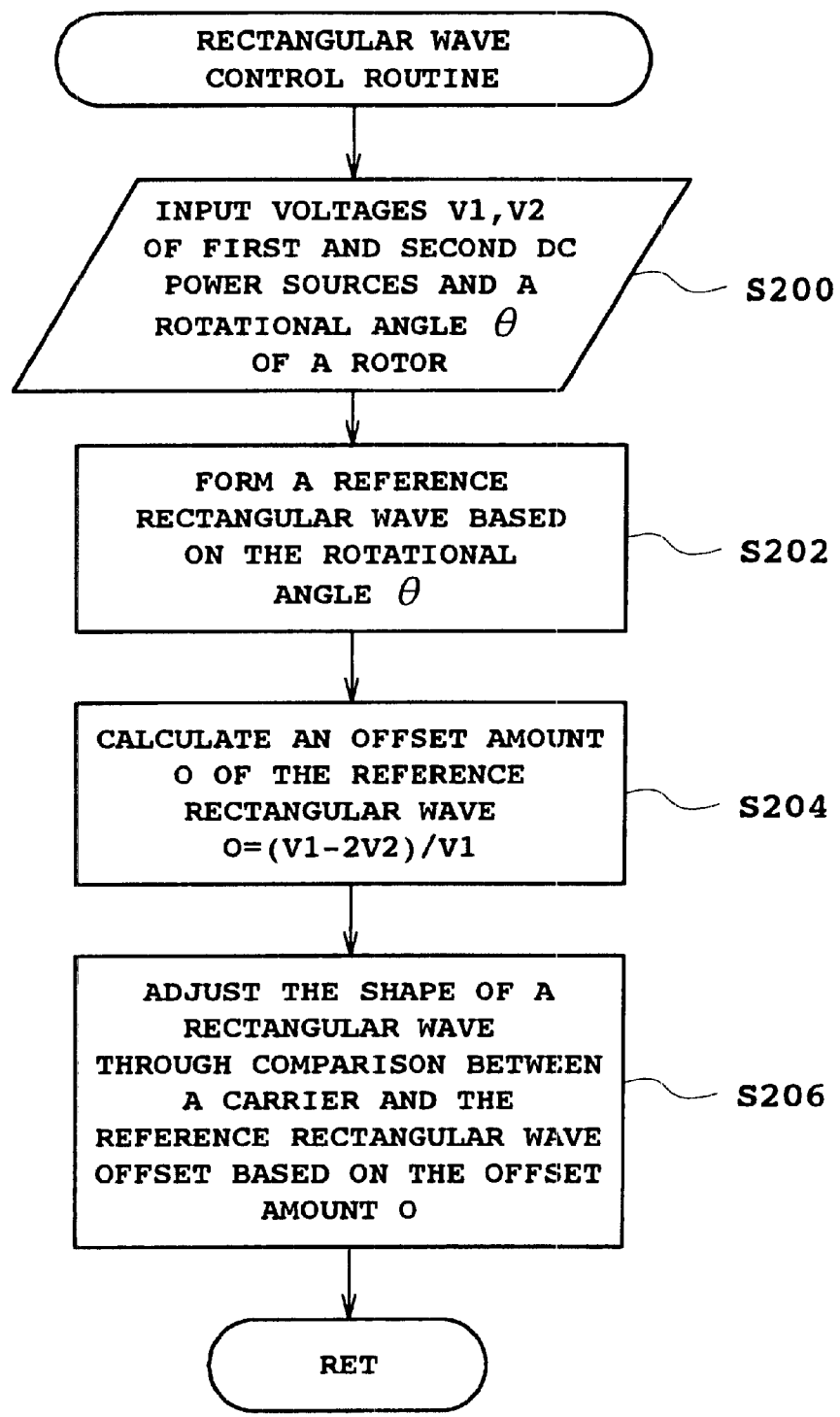
FIG. 12 is a flowchart showing an example of a rectangular wave control routine executed by the electric control unit 40 in controlling such that a DC component current flows into the three phase coils of the motor 22.
Figure 13:
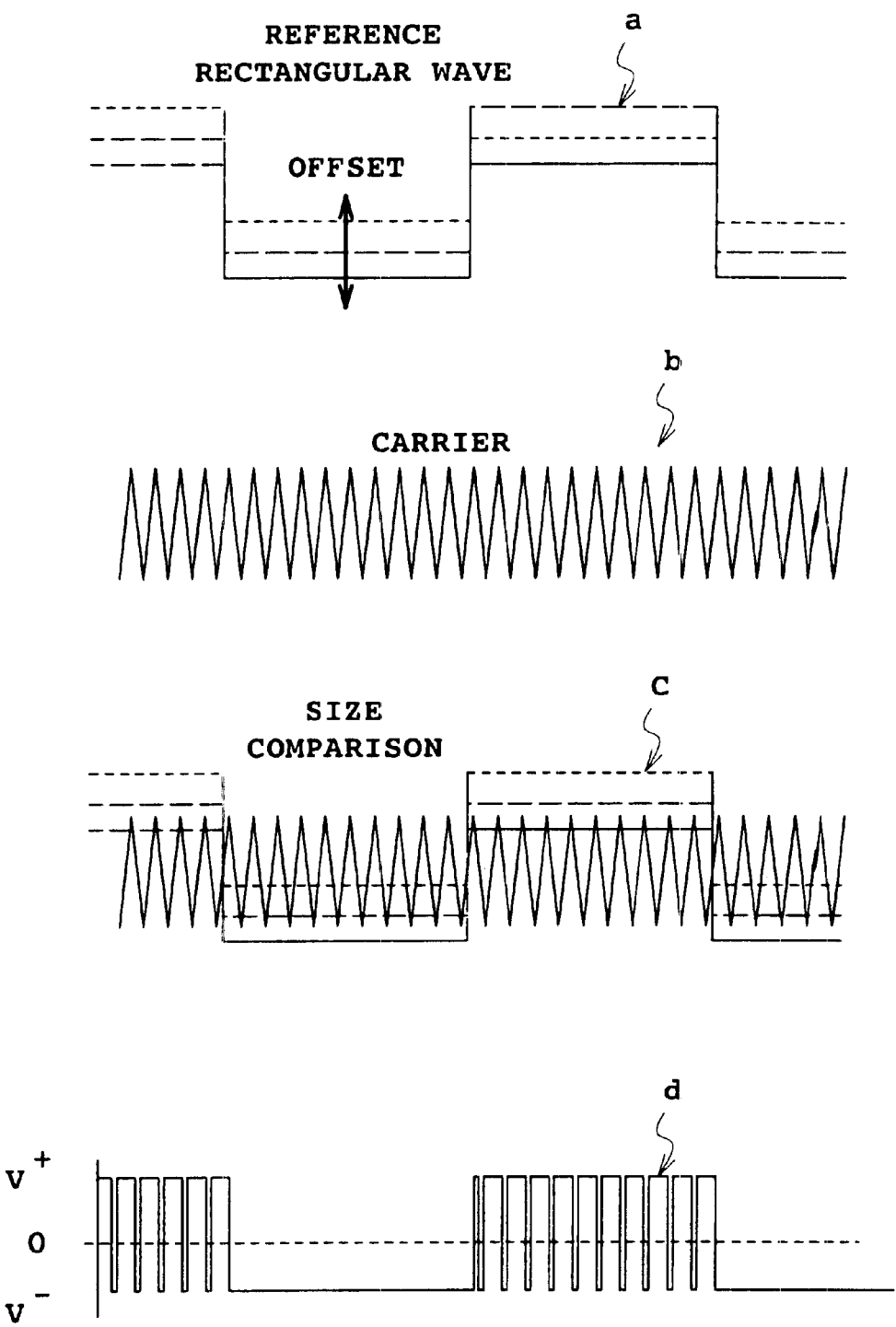
FIG. 13 is a diagram explaining adjustment of the effective voltage of a rectangular wave.

To start the rectangular wave control routine of FIG. 12, the CPU 42 of the electronic control unit 40 first inputs values of the voltages V1, V2 of the first and second DC power sources 30, 32, respectively, and a rotor rotational angle θ of the motor 22 (step S200). The CPU 42 then forms a reference rectangular wave based on the rotor rotational angle θ input (step S202, waveform (a) in FIG. 13). A reference rectangular wave is a rectangular wave identical to that which is formed through general rectangular wave control except for the manner of setting its amplitude. For example, duration of the negative pulse and that of the positive pulse of the reference rectangular wave may be set equal, namely, time T, and the frequency may be set based on the rotation frequency of the rotor of the motor 22, calculated based on the rotational angle θ. The amplitude of the reference rectangular wave may be set based on the amplitude of a carrier (for example, a triangular wave shown as waveform (b) in FIG. 13) which is used in adjustment of the effective area of either the positive or negative pulse, and may be set equal to that of the carrier, for example.

Once a reference rectangular wave is thus formed, an amount by which the reference rectangular wave is offset relative to the carrier, namely, an offset amount O, is calculated based on the input values of the voltages V1, V2 of the first and second DC power sources 30, 32, respectively (step S204). Subsequently, the reference rectangular wave is offset by the offset amount O calculated, and then compared with the carrier (waveform (c) in FIG. 13), whereby a rectangular wave to be supplied to the motor 22 is formed (step S206, waveform (d) in FIG. 13). This marks the end of the rectangular wave control routine. Adjustment of the shape of the rectangular wave is achieved using pulse width modulation control. Then, a control signal for a rectangular wave now adjusted into a comb-like shape is output to the transistors T1 to T6 of the inverter circuit 24 for driving the motor 22 to rotate.

Here, it should be noted that the reference rectangular wave is offset, as described above, for adjustment of the effective voltages of the positive and negative pulses of the wave. Specifically, the ratio between positive and negative voltages V+, V− in each cycle of the carrier is adjusted. In this embodiment, an offset amount O is expressed in the form of a ratio of a difference between the upper (or lower) peak values of the carrier and of the reference rectangular wave, relative to a difference between the upper and lower peak values of the carrier, which corresponds to double the carrier amplitude.

An offset amount O is calculated as follows based on the voltages V1, V2 of the first and second power sources 30, 32, respectively.

Figure 14:
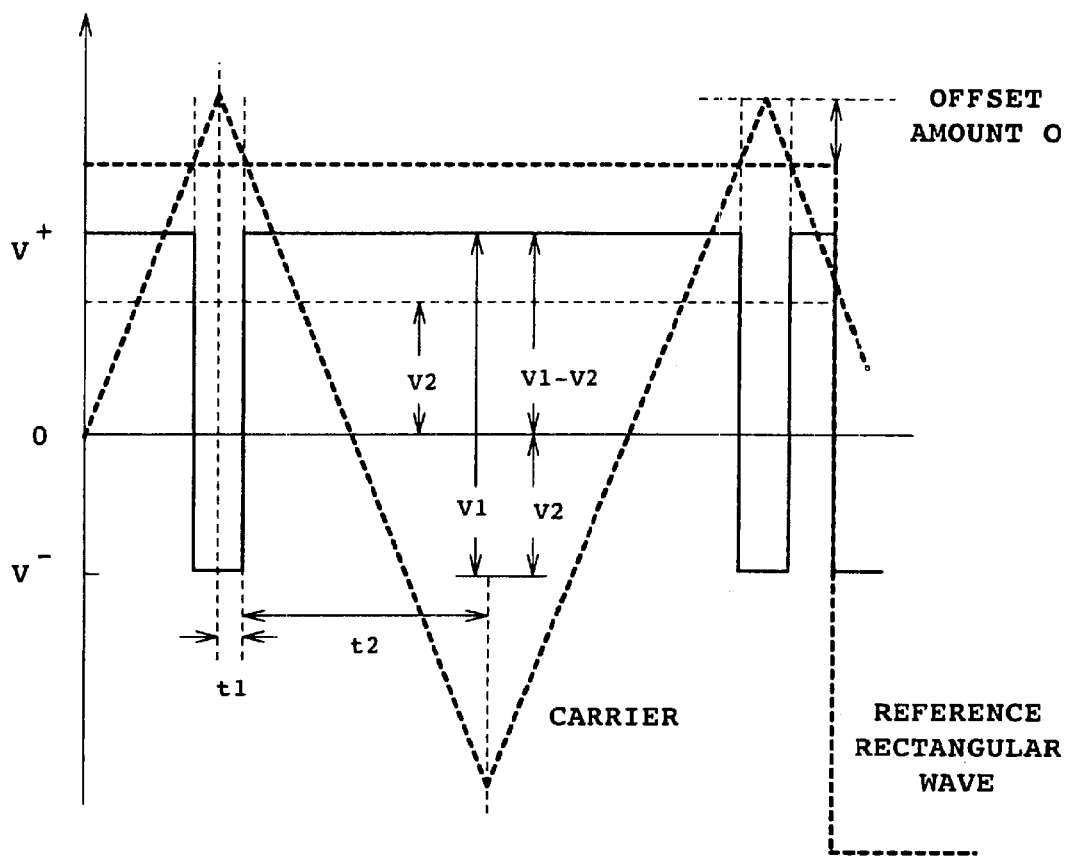
FIG. 14 is a diagram explaining a relationship between voltages V1, V2 of the first DC power source 30 and the second DC power source 32, respectively, and an offset amount O.

FIG. 14 is a diagram explaining a relationship between the voltages V1, V2 of the first and second DC power sources 30, 32, respectively, and an offset amount O. In the case shown in the drawing, the value V1−V2, namely, the voltage V1 of the first DC power source 30 deducted by the voltage V2 of the second DC power source 32, is larger than the voltage V2, in other words, the value of the positive voltage V+ is larger than the absolute value of the negative voltage V−. In order to block a DC component current from flowing into the three phase coils of the motor 22 in this case, an offset amount O should be calculated, which would result in positive and negative pulse having equal effective area, i.e., equal effective voltages, when the rectangular wave is offset by that offset amount O.

During the unit time segments t1+t2 in FIG. 14, in which the carrier shifts from its upper peak to its lower peak, a rectangular wave resulting from the comparison between the carrier and the positive pulse of the reference rectangular wave offset by the offset amount O, has a negative voltage V− during the time segment t1, and a positive voltage V+ during the time segment t2. As the negative voltage V− and the positive voltage V+ are equivalent to the voltage V2 and the voltage V1−V2, respectively, the effective area of the positive pulse in the time segments t1+t2 becomes a value (V1−V2)t2−V2·t1.

Meanwhile, a rectangular wave resulting from the comparison between the carrier and the negative pulse of the reference rectangular wave offset by the offset amount O, has a negative voltage V− during the entire time segments t1+t2. This is because the value of the negative pulse of the reference rectangular wave offset remains smaller than that of the carrier. Therefore, the effective area of the negative pulse becomes a value V2(t1+t2).

In view of the above, in order for the positive and negative pulses to have equal effective areas during the unit time segments t1+t2, the expression (3) must be held. The expression (3) can be restated in view of the effective voltages of the negative and positive pulses, as the expression (4).

$$V2(t1+t2)=(V1-V2)t2-V2\cdot t1 \quad (3)$$

$$V2=((V1-V2)t2-V2\cdot t1)/(t1+t2) \quad (4)$$

Meanwhile, when using double the amplitude of the carrier as a unit amount, the offset amount O can be obtained using the expression (5) based on time t1, t2.

$$O=t1/(t1+t2) \quad (5)$$

From the expression (5), the expression (6) is obtained.

$$1-O=t2/(t1+t2) \quad (6)$$

Then, elimination of time t1, t2 from expression (4) by assigning expressions (5) and (6) into expression (4) leads to an offset amount O, expressed as expression (7).

$$O=(V1-2\cdot V2)/V1 \quad (7)$$

As will be appreciated from the above, an offset amount O is calculated using the expression (7) based on the voltages V1, V2 of the first and second DC power sources 30, 32, respectively, and the reference rectangular wave is offset relative to the carrier by the offset amount O obtained, to form a rectangular wave to be supplied to the motor 22.

As a result, a DC component current is blocked from flowing into the three phase coils of the motor 22. Note that an offset amount O can be similarly calculated using the expression (7) even when the absolute value of the negative voltage V− is larger than that of the positive voltage V+.

In addition, it is also possible to control such that a current of desired DC component does flow into the three phase coils of the motor 22. For this purpose, the reference rectangular wave may be offset more or less than the offset amount O calculated using the expression (7), depending on the direction in which the DC component current flows or the amount of the current. This relies on the fact that an offset amount O has some correlation to a difference between the effective areas of the negative and positive pulses, namely, the average voltage of the negative and positive pulses, and also that the average voltage has some correlation to a DC component current flowing into the three phase coils of the motor 22.

Conclusively, this modified example can also produce the advantages achieved by the power output devices 20, 120 in the first and second embodiments. Specifically, the modified example can block a DC component current from flowing into the three phase coils of the motor 22, or cause a current of desired DC component to flow into the three phase coils of the motor 22.

Here, the effective voltages of the pulses to be applied to the three phase coils of the motor 22 are adjusted through switching the transistors T1 to T6 of the inverter circuit 24. Therefore, the transistors T1 to T6 must be switched with smaller intervals, which is effective to suppress ripples in a current flowing into the neutral point of the motor 22. Note that whereas the reference rectangular wave is offset relative to the carrier in the above, the carrier may instead be offset relative to the reference rectangular wave.

In the modified examples of the power output devices 20, 120 in the first and second preferred embodiments, respectively, either the negative or positive pulse is adjusted so as to have a comb-like shape having equidistant intervals, namely, a pulse having a rectangular-waved effective area. However, the shape of an effective area is not limited to a rectangular shape, and a pulse may be adjusted so as to have an effective area in any other shape, such as a sinusoidal waved effective area, as long as it allows adjustment of the effective voltage of either negative or positive pulse.

Figure 15:
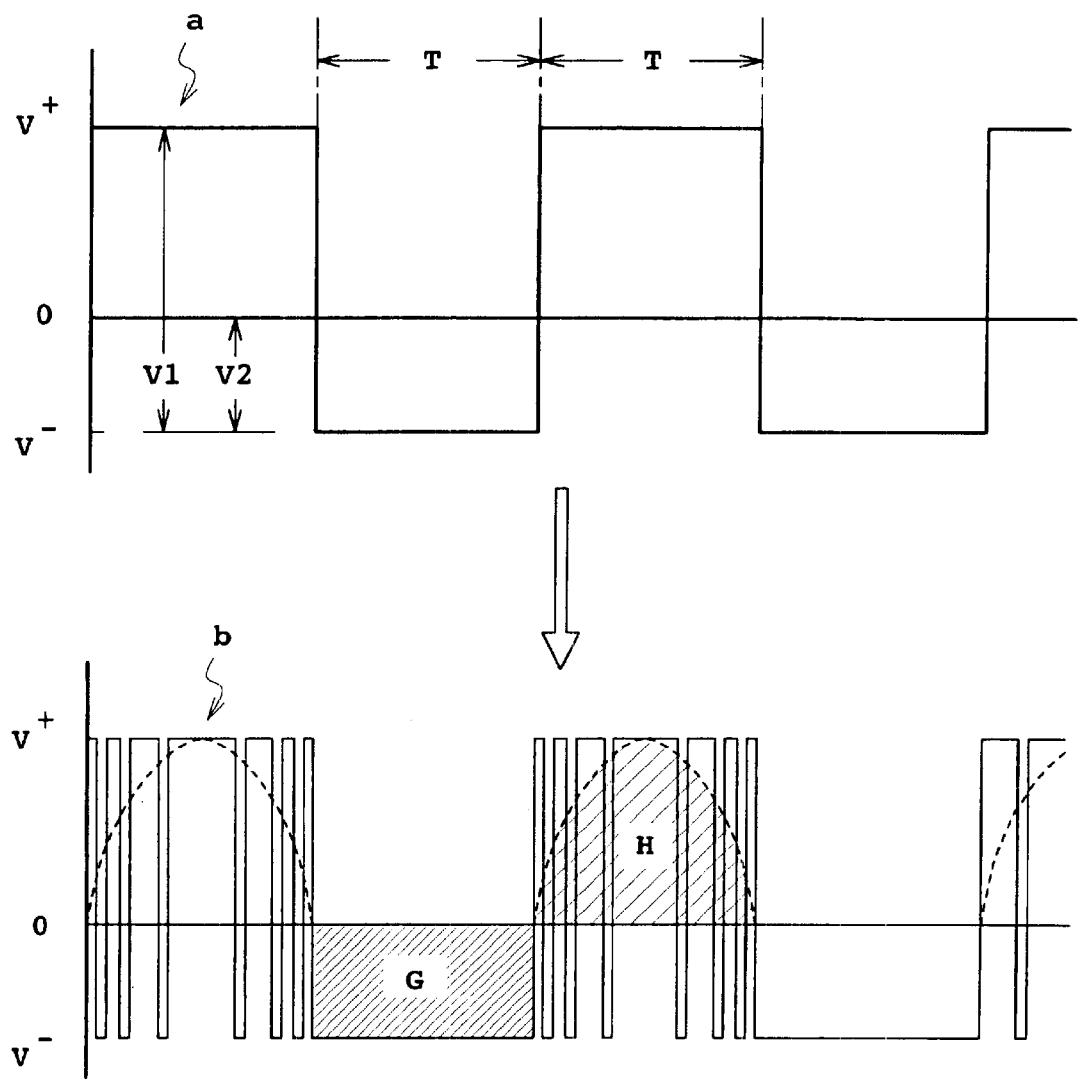
FIG. 15 is a diagram explaining adjustment of the effective voltage of a rectangular wave.

FIG. 15 is a diagram explaining adjustment of the effective voltage of a rectangular wave. In regular rectangular wave control, in which a negative voltage V− time and a positive voltage V+ time are equal, or time T, the average voltage of the rectangular wave does not become the value 0 and a DC component current thus flows into the three phase coils of the motor 22 when the absolute values of the negative voltage V− and of the positive voltage V+ are different.

In order to address this problem, either the negative or positive pulse is adjusted into a comb-like shape in which duration of either the negative or positive voltage V−, V+ becomes longer as it goes toward the middle of each pulse. That is, a sinusoidal pulse having effective areas defined by the curve line over the waveform (b) in FIG. 15 is formed. This adjustment is made through switching of the transistors T1 to T6 of the inverter circuit 24.

Specifically, the shape of the pulse is adjusted such that the effective voltage of the negative pulse to be supplied to the three phase coils of the motor 22 and that of the positive pulse to be supplied to the three phase coils of the motor 22 become equal to each other. As a result, the area G, representing the absolute value of a time integration value of the negative pulse, becomes equal to the area H, representing a time integration value of the positive pulse, so that no DC component current thus flows into the three phase coils of the motor 22. This prevention of a DC component current from flowing into the three phase coils of the motor 22 as described above is achieved according to the rectangular wave control routine shown in FIG. 16, instead of that in FIG. 12.

In the following, the routine explained in FIG. 16 will be described with reference to FIG. 17, which explains adjustment of the effective voltage of a rectangular wave.

Figure 16:
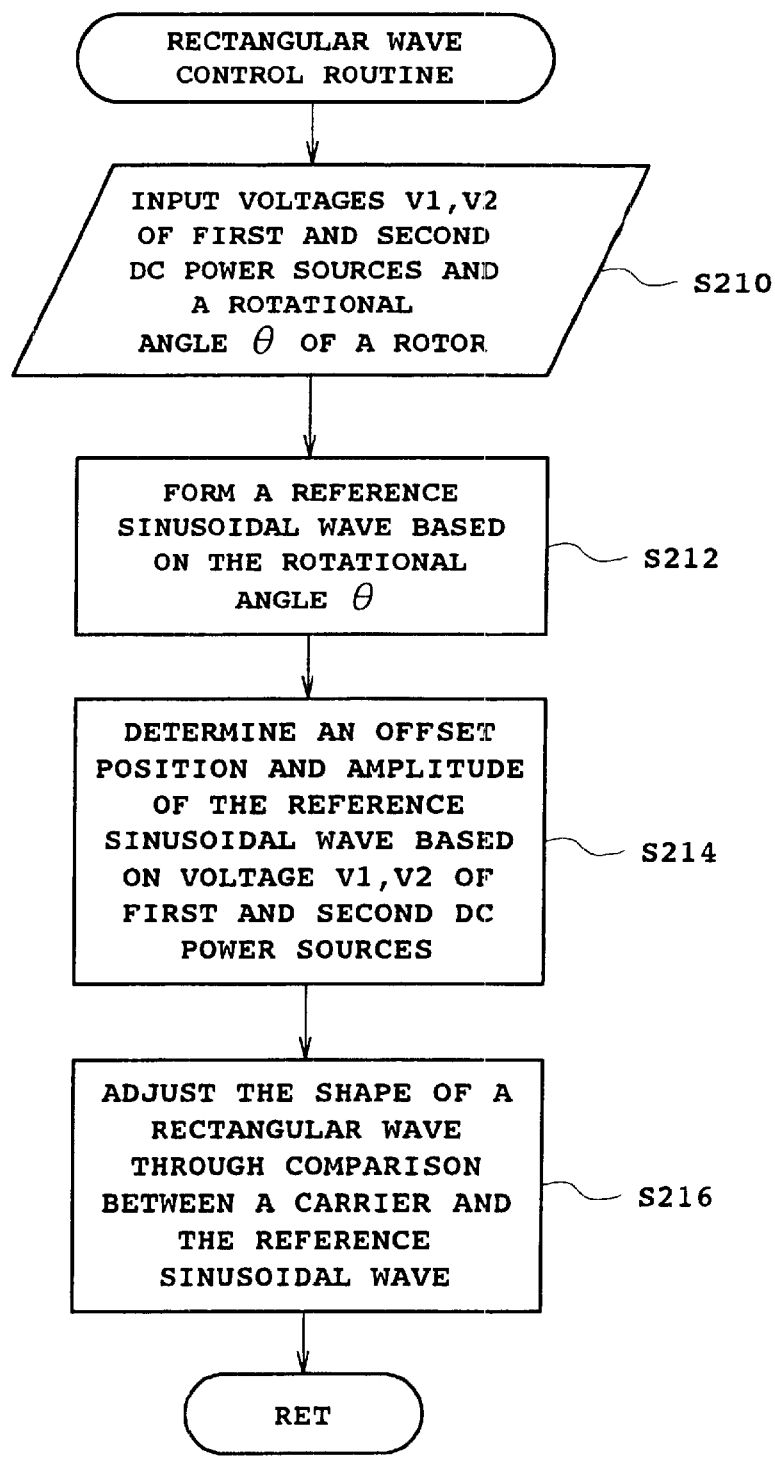
FIG. 16 is a flowchart showing another example of a rectangular wave control routine executed by the electric control unit 40 in controlling such that a DC component current flows into the three phase coils of the motor 22.
Figure 17:
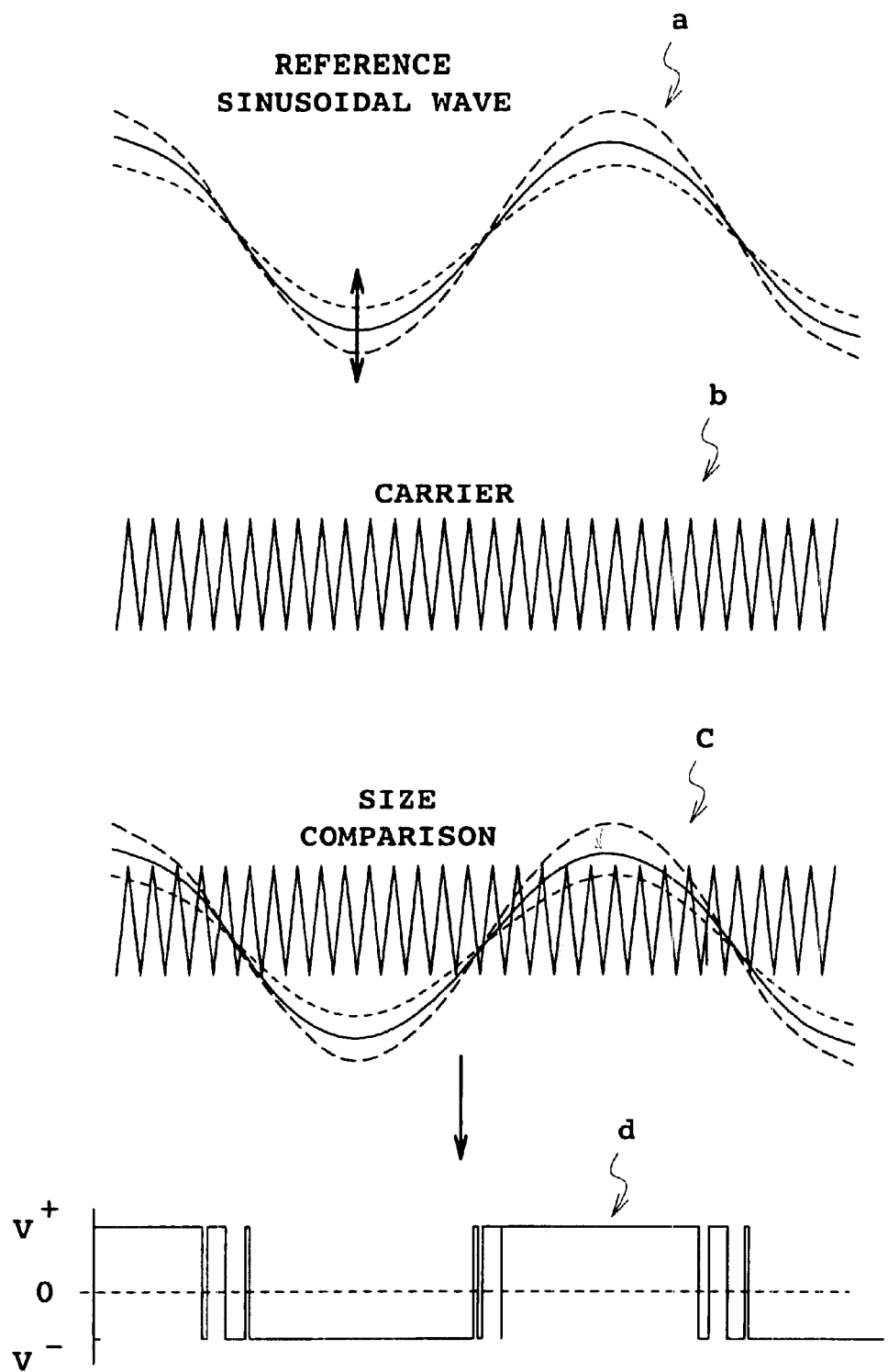
FIG. 17 is a diagram explaining adjustment of the effective voltage of a rectangular wave.

To start the rectangular wave control routine of FIG. 16, the CPU 42 of the electronic control unit 40 first inputs values of the voltages V1, V2 of the first and second DC power sources 30, 32, respectively, and a rotor rotational angle θ of the motor 22 (step S210), similar to step S200 in FIG. 12. The CPU 42 then forms a reference sinusoidal wave based on the rotor rotational angle θ input (step S212, waveform (a) in FIG. 17). A reference sinusoidal wave is a reference wave for use in adjustment of a rectangular wave to be supplied to the motor 22, through comparison with a carrier (e.g., a triangular waveform shown as waveform (b) in FIG. 17). The frequency of the reference sinusoidal wave may be determined based on the rotation speed of the rotor of the motor 22 calculated based on the rotational angle θ.

Once a reference sinusoidal wave is thus formed, an offset position and an amplitude are determined based on the input voltages V1, V2 of the first and second DC power sources 30, 32, respectively (step S214). Subsequently, the reference sinusoidal wave is compared with the carrier (waveform (c) in FIG. 13), so that a rectangular wave to be supplied to the motor 22 is formed (step S206, waveform (d) in FIG. 13). This marks the end of the rectangular wave control routine. The shape of the rectangular wave to be supplied to the motor 22 is adjusted using pulse width modulation control. Then, a control signal concerning the comb-shaped rectangular wave is output to the transistors T1 to T6 of the inverter circuit 24 for driving the motor 22 to rotate.

Here, it should be noted that the reference sinusoidal wave is offset for adjustment of the effective voltage of only a pulse having one of the positive and negative voltages V−, V+, which has a larger absolute value, into a comb-like shape. In this embodiment, the reference sinusoidal wave is offset such that the average of the reference sinusoidal wave coincides with a peak of the carrier. Specifically, for the positive voltage V+ of which the absolute value is larger than that of the negative voltage V−, for example, the offset position of the reference sinusoidal wave is determined such that the average of the reference sinusoidal wave coincides with the lower peak of the carrier. On the contrary, for the positive voltage V+ of which absolute value is smaller than that of a negative voltage V−, the offset position of the reference sinusoidal wave is determined such that the average of the reference sinusoidal wave coincides with the upper peak of the carrier. Note that whereas the reference sinusoidal wave is offset in the above, the carrier may instead be offset relative to the reference sinusoidal wave.

The amplitude of a reference sinusoidal wave is determined such that an area representing the absolute value of a time integration value of the negative pulse to be supplied to the motor 22 and an area representing a time integration value of the positive pulse to be supplied to the motor 22 become equal to each other.

In the following, determination of an amplitude of a reference sinusoidal wave will be described.

For the positive voltage V+ of which absolute value is larger than that of the negative voltage V−, for example, when the reference sinusoidal wave is offset such that the average of the wave coincides with the lower peak of the carrier, the value of the negative pulse of the reference sinusoidal wave resultantly remains smaller than that of the carrier. Therefore, the voltage of the negative pulse of a rectangular wave resulting from the comparison between the reference sinusoidal wave and the carrier remains as a negative voltage V−. However, for the positive pulse of the offset reference sinusoidal wave, the voltage becomes equal to a positive voltage V+ at parts where the value of the reference sinusoidal wave offset is larger than that of the carrier, and equal to a negative voltage V− at parts where the value of the reference sinusoidal wave offset is smaller than that of the carrier.

As the reference wave here is a sinusoidal wave, a rectangular wave resulting from the comparison between the reference sinusoidal wave and the carrier has a shape in which duration of the positive voltage V+ becomes longer as it goes to the middle of each positive pulse and thus has an effective area in a sinusoidal shape. Here, the effective voltage of the positive pulse depends on the magnitude of the amplitude of the associated reference sinusoidal wave. Therefore, when the amplitude of the reference sinusoidal wave is defined at a point allowing the effective voltage of the positive pulse to be equal to the voltage of the negative pulse, namely, a negative voltage V−, an area representing the absolute value of a time integration value of the negative pulse voltage and that representing a time integration value of the positive pulse voltage become equal to each other, and thus no DC component current flows into the neutral point of the motor 22. Such an amplitude of the reference sinusoidal wave is determined through calculation or mapping based on the voltages V1, V2 of the first and second DC power source 30, 32, respectively, and the amplitude of the carrier.

Note that the amplitude can also be similarly determined in the case of a negative voltage V− of which absolute value is larger than that of the positive voltage V+. In the case of a negative voltage V− of which absolute value is equal to that of the positive voltage V+, the amplitude is determined such the reference sinusoidal wave intersects the carrier only at a point corresponding to the average of the reference sinusoidal wave, so that a rectangular wave identical to that which would be formed through general rectangular wave control is formed.

In addition, it is also possible to control such that current of desired DC component does flow into the three phase coils of the motor 22. In this case, the amplitude of the reference sinusoidal wave may be determined smaller or larger than amplitude determined at step S214. This relies on the fact that the amplitude of a reference sinusoidal wave has some correlation to a difference between the effective areas of negative and positive pulses, namely, the average voltage of the negative and positive pulses, and also that the average voltage has some correlation to a DC component current flowing to the three phase coils of the motor 22.

As is appreciated from the above, this modified example can also produce the advantages achieved by the power output devices 20, 120 in the first and second embodiments. Specifically, the modified example can block a DC component current from flowing into the three phase coils of the motor 22, and alternatively cause a current of desired DC component to flow into the three phase coils of the motor 22.

Here, voltages of the pulses are adjusted through switching of the transistors T1 to T6 of the inverter circuit 24 in this modified example. Therefore, the transistors T1 to T6 must be switched with smaller intervals, which is effective to suppress ripples in current flowing to the neutral point of the motor 22.

It should be noted that, although the motors 22 in the power output devices 20, 120 in the first and second embodiments, respectively, and modified example of them are realized in the form of a synchronous power generator motor designed to be driven using a rectangular-waved three phase voltage, any other types of motor designed to be driven using a multiple phase rectangular-waved voltage may be employed instead.

Although preferred embodiments of the present invention have been described, the present invention is not limited to those embodiments, and may be realized in variety of formations without departing the gist of the present invention.

What is claimed is:

1. A power output device, comprising:
   a motor designed to be driven to rotate using multiple phase AC power;
   an inverter circuit supplying multiple phase AC power to the motor while switching a plurality of switching elements;
   a first power source connected to a positive bus bar and a negative bus bar of the inverter circuit;
   a second power source connected to the positive bus bar or the negative bus bar of the inverter circuit and to a neutral point of the motor; and
   a controller for controlling switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source.

2. A power output device according to claim 1, wherein the first power source is chargeable using power from the second power source.

3. A power output device according to claim 1, wherein the controller controls switching of the plurality of switching elements of the inverter circuit, concerning the respective phases of the multiple phase AC power, using ratios, as the predetermined ratios, which would make a difference between a time integration value of a voltage of a positive pulse and an absolute value of a time integration value of a voltage of a negative value become a predetermined value.

4. A power output device according to claim 3, wherein the controller performs control with the predetermined value being zero.

5. A power output device according to claim 3, wherein the controller controls switching of the plurality of switching elements of the inverter circuit, with the predetermined value being any value other than zero, so that a current in a predetermined direction flows into a neutral point of the motor.

6. A power output device according to claim 3, wherein the controller adjusts a ratio between the positive pulse and the negative pulse concerning each of the respective phases of the multiple phase AC power such that the difference becomes the predetermined value.

7. A power output device according to claim 3, wherein the controller adjusts an effective voltage of either the positive pulse or the negative pulse concerning each of the respective phases of the multiple phase AC power such that the difference becomes the predetermined value.

8. A power output device according to claim 7, wherein the controller adjusts the effective voltage of a pulse through pulse width modulation.

9. A power output device according to claim 1, wherein the motor is a generator motor capable of generation in response to power input thereto,
   at least one of the first power source or the second power source is a rechargeable and dischargeable power source, and
   the power output device comprises a charge controller for driving the motor so as to operate as a power generator, and controlling switching of the plurality of switching elements of the inverter circuit so that the at least one of the first power source or the second power source are charged using power generated by the motor.

10. A power output device, comprising:
    a motor designed to be driven to rotate using multiple phase AC power;
    an inverter circuit supplying multiple phase AC power to the motor while switching a plurality of switching elements;
    a first power source connected to a positive bus bar of the inverter circuit and to a neutral point of the motor;
    a second power source connected to the negative bus bar of the inverter circuit and to a neutral point of the motor; and
    a controller for controlling switching of the plurality of switching elements of the inverter circuit such that a ratio between positive and negative voltages relative to a potential at the neutral point of the motor, concerning respective phases of the multiple phase AC power to be supplied to the motor, become a predetermined ratio based on a voltage of the first power source and a voltage of the second power source.

11. A power output device according to claim 10, wherein the first power source is chargeable using power from the second power source.

12. A power output device according to claim 10, wherein the second power source is chargeable using power from the first power source.

13. A power output device according to claim 10, further comprising a chargeable and dischargeable capacitor, connected to the positive bus bar and the negative bus bar of the inverter circuit.

14. A power output device according to claim 10, wherein the controller performs control, concerning the respective phases of the multiple phase AC power using, as the predetermined ratio, a ratio which would make a difference between a time integration value of a voltage of a positive pulse and an absolute value of a time integration value of a voltage of a negative value become a predetermined value.

15. A power output device according to claim 14, wherein the controller performs control with the predetermined value being zero.

16. A power output device according to claim 14, wherein the controller performs control, with the predetermined value being any value other than zero, so that a current in a predetermined direction flows into a neutral point of the motor.

17. A power output device according to claim 14, wherein the controller adjusts a ratio between the positive pulse and the negative pulse concerning each of the respective phases of the multiple phase AC power such that the difference becomes the predetermined value.

18. A power output device according to claim 14, wherein the controller adjusts an effective voltage of either the positive pulse or the negative pulse concerning each of the respective phase of the multiple phase AC power such that the difference becomes the predetermined value.

19. A power output device according to claim 18, wherein the controller adjusts the effective voltage of a pulse through pulse width modulation.

20. A power output device according to claim 10, wherein
the motor is a generator motor capable of power generation in response to power input thereto,
at least one of the first power source or the second power source is a rechargeable and dischargeable power source, and
the power output device comprises a charge controller for controlling switching of the plurality of switching elements of the inverter circuit so that the motor is driven to operate as a generator, and that the at least one of the first power source of the second power source are charged using power generated by the motor.

* * * * *